(12) United States Patent
Aikawa et al.

(10) Patent No.: US 7,615,113 B2
(45) Date of Patent: Nov. 10, 2009

(54) INK, INK JET RECORDING METHOD, INK CARTRIDGE, RECORDING UNIT, AND INK JET RECORDING APPARATUS

(75) Inventors: Yoshihide Aikawa, Yokohama (JP); Eiichi Nakata, Saitama (JP); Yojiro Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/092,001

(22) PCT Filed: Dec. 21, 2006

(86) PCT No.: PCT/JP2006/326171

§ 371 (c)(1),
(2), (4) Date: Apr. 29, 2008

(87) PCT Pub. No.: WO2007/072994

PCT Pub. Date: Jun. 28, 2007

(65) Prior Publication Data

US 2009/0095199 A1    Apr. 16, 2009

(30) Foreign Application Priority Data

Dec. 21, 2005  (JP) .......................... 2005-368243
Dec. 20, 2006  (JP) .......................... 2006-342819

(51) Int. Cl.
*C09D 11/00* (2006.01)
*C09D 11/02* (2006.01)
*B41J 2/01* (2006.01)

(52) U.S. Cl. .................... 106/31.47; 347/100
(58) Field of Classification Search .......... 106/31.47, 106/31.49; 347/100
See application file for complete search history.

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 |
| 4,248,852 A | 2/1981 | Wakabayashi et al. | 423/626 |
| 4,723,129 A | 2/1988 | Endo et al. | 346/1.1 |
| 4,740,796 A | 4/1988 | Endo et al. | 346/1.1 |
| 5,091,009 A | 2/1992 | Nogami et al. | 106/287.1 |
| 5,123,960 A | 6/1992 | Shirota et al. | 106/22 |
| 5,221,497 A | 6/1993 | Watanabe et al. | 252/313.2 |
| 6,976,755 B2 | 12/2005 | Sato et al. | 347/100 |
| 7,034,149 B2 | 4/2006 | Hirokazu et al. | 540/145 |
| 7,160,372 B2* | 1/2007 | Yoshizawa et al. | 106/31.47 |
| 7,201,791 B2* | 4/2007 | Okamura et al. | 106/31.47 |
| 7,219,988 B2 | 5/2007 | Hanaki et al. | 347/100 |
| 7,226,498 B2* | 6/2007 | Yamashita et al. | 106/31.5 |
| 7,241,332 B2* | 7/2007 | Yoshizawa et al. | 106/31.47 |
| 7,244,299 B2 | 7/2007 | Tsuji et al. | 106/31.48 |
| 7,247,194 B2* | 7/2007 | Okamura et al. | 106/31.47 |
| 7,270,701 B2* | 9/2007 | Jinnou et al. | 106/31.47 |
| 7,285,159 B2 | 10/2007 | Aikawa et al. | 106/31.47 |
| 7,288,143 B2 | 10/2007 | Aikawa et al. | 106/31.58 |
| 7,294,184 B2 | 11/2007 | Fujimoto et al. | 106/31.47 |
| 7,297,197 B2* | 11/2007 | Jinnou et al. | 106/31.47 |
| 7,374,606 B2 | 5/2008 | Sato et al. | 106/31.27 |
| 7,419,537 B2* | 9/2008 | Fujii et al. | 106/31.47 |
| 7,504,488 B2* | 3/2009 | Toyoda et al. | 106/31.48 |
| 2006/0011097 A1 | 1/2006 | Tsuji et al. | 106/31.48 |
| 2006/0125896 A1 | 6/2006 | Aikawa et al. | 347/100 |
| 2007/0022903 A1 | 2/2007 | Fujii et al. | 106/31.47 |
| 2007/0107627 A1* | 5/2007 | Negishi et al. | 106/31.47 |
| 2008/0047461 A1 | 2/2008 | Hanmura et al. | 106/31.47 |
| 2008/0274286 A1* | 11/2008 | Yamashita et al. | 106/31.47 |
| 2009/0047430 A1* | 2/2009 | Mori et al. | 347/100 |

FOREIGN PATENT DOCUMENTS

| | | |
|---|---|---|
| EP | 1468050 | 10/2004 |
| EP | 1749863 | 2/2007 |
| JP | 57-44605 B2 | 9/1982 |
| JP | 2803134 B2 | 9/1998 |
| JP | 2881847 B2 | 4/1999 |
| JP | 2942319 B2 | 8/1999 |
| JP | 2002-105349 | 4/2002 |
| JP | 2003-213167 | 7/2003 |
| JP | 2004-323605 | 11/2004 |
| JP | 2005-320529 | 11/2005 |
| WO | WO 03/062323 A1 | 7/2003 |

| WO | WO 2004/087815 A1 | 10/2004 |
| WO | WO 2005/097923 A1 | 10/2005 |

OTHER PUBLICATIONS

International Search Report and Written Opinion in PCT/JP2006/326171, Apr. 3, 2007.
Jul. 3, 2008 International Preliminary Report on Patentability in International PCT Patent Appln. No. PCT/JP2006/326171.

\* cited by examiner

*Primary Examiner*—Helene Klemanski
(74) *Attorney, Agent, or Firm*—Fitzpatrick, Cella, Harper & Scinto

(57) ABSTRACT

It is an object to provide an ink that forms an image which is superior in color developability, has high environmental gas resistance, and further has superior bronze resistance. The ink comprising at least a coloring material is wherein the coloring material comprises a compound represented by a following general formula (I) or a salt thereof; the coloring material comprises a compound represented by a following general formula (I) or a salt thereof; and the maximum absorption wavelengths obtained by measuring an absorbance of a liquid prepared by diluting 2,000 times the ink with 90 mass % of N,N-dimethylformamide aqueous solution are respectively in a range of 580 nm or more and 640 nm or less and in a range of 650 nm or more and 700 nm or less; and a ratio B/A of 0.75 or more and 0.90 or less, wherein A is an absorbance at a maximum absorption wavelength in the range of 580 nm or more and 640 nm or less, and B is an absorbance at the maximum absorption wavelength in a range of 650 nm or more and 700 nm or less.

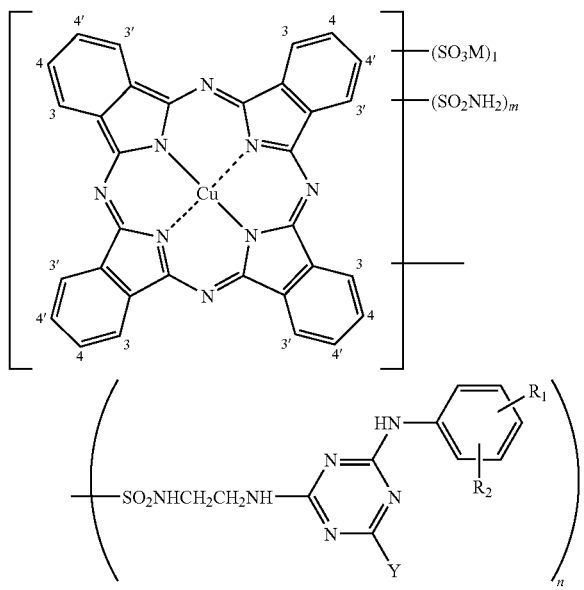

General Formula (I)

12 Claims, 13 Drawing Sheets

INK, INK JET RECORDING METHOD, INK CARTRIDGE, RECORDING UNIT, AND INK JET RECORDING APPARATUS

TECHNICAL FIELD

The present invention relates to an ink which has excellent color developability, shows an excellent environmental gas resistance, inhibits a metallic luster referred to as a bronze phenomenon even when the ink is recorded on a recording medium, and consequently provides an excellent image. The present invention also relates to an ink jet recording method, an ink cartridge, a recording unit, and an ink jet recording apparatus, each using the ink.

BACKGROUND ART

An ink jet recording method is a recording method involving applying a small ink droplet to any one of recording media such as plain paper and glossy media to form an image, and had become rapidly widespread owing to a reduction in its cost and an improvement in its recording rate. With the rapid spread of a digital camera in addition to an improvement in quality of an image recorded by the method, the method has been generally used as a method of outputting a photographic image comparable to a silver halide photograph. Based on this, performance required to an ink jet recording method of an outputting method has been diversified. As for the picture quality, for instance, high color developability and a wide color-reproducing range have been required, so as to faithfully reproduce the image sent from an outputting source, as the digital camera acquires higher resolution and higher sensitivity.

On the other hand, a problem is pointed out that the quality of an image in an obtained recorded matter by an ink jet recording method is not kept so long as that in a silver halide photograph. There has been a problem that an image quality in a recorded matter obtained by the ink jet recording method is kept not longer than that in the silver halide photograph in general, and that the image tends to cause the change of its color tone and color fading due to the deterioration of a coloring material, when the recorded matter is exposed to light, humidity, heat and a environmental gas existing in the air for a long period of time. It has been a conventional problem for the ink jet recording system to improve particularly the environmental gas resistance up to a level of the silver halide photograph. Cyan has the lowest environmental gas resistance among yellow, magenta, and cyan, which are hues used for ink. Therefore, it has been one of the important problems in the ink jet recording method to improve the environmental gas resistance of the cyan ink to the level comparable to that of yellow ink or magenta ink.

The basic skeletons of coloring materials for ink having a cyan hue are roughly classified into a phthalocyanine skeleton and a triphenylmethane skeleton. The representative coloring materials of the former include C.I. Direct Blue 86 and 87, and C.I. Direct Blue 199. Representative coloring materials of the latter include C.I. Acid Blue 9.

In general, a phthalocyanine-based coloring material is characterized in that it is excellent in alight resistance as compared to a triphenylmethane-based coloring material. Furthermore, the phthalocyanine-based coloring material has high fastness properties against humidity or heat and has good color developability, and so the coloring material has been vigorously used as a coloring material for ink.

However, the phthalocyanine-based coloring material tends to be inferior in fastness against environmental gases in the air (such as ozone, $NO_x$ or $SO_2$), especially an ozone gas. In particular, in a recorded product obtained by applying the coloring material on a recording medium having an ink-receiving layer containing an inorganic substance such as alumina or silica, the fastness of a recorded matter is remarkably low, so the color fading of the recorded matter is remarkable when the recorded product is left standing in a room for a long period of time. For the purpose of improving the environmental gas resistance, various dyes have been proposed which are represented by the dye disclosed in Japanese Patent Application Laid-Open No. 2004-323605, for instance.

In addition, Japanese Patent Application Laid-Open No. 2002-105349 discloses that an ink containing a mixture of cyan dyes formed of copper phthalocyanine having a —$SO_2NH_2$ group and a —$SO_2M$ group as a substituent group provides a recorded matter which causes a little change in color even when having been left unattended in ozone gas. Japanese Patent Laid-Open No. 2002-105349 also discloses that the cyan dye mixture with a little change in the color among such cyan dye mixtures is specified by two methods described below. The first judgment method will be now described below. In an absorption curve obtained when the cyan dye mixture is dissolved in N,N-dimethyl formaldehyde and the absorbance is measured with a spectrophotometer while adjusting an absorbance to 1 to 2 Abs, an absorption peak wavelength in a range of 615 to 640 nm shall be defined as C, and an absorption peak wavelength in a range of 655 to 680 nm shall be defined as D. Then, the cyan dye mixture with little change in the color should have a value (D−C) of 48 nm or less. The second judgment method will be now described below. In a chromatogram obtained when the cyan dye mixture is dissolved in an aqueous solution of acetonitrile/ammonium dihydrogen phosphate of a developing solvent and the chromatogram is measured with a high-performance liquid chromatography, an absorption peak wavelength in a range of 590 to 630 nm shall be defined as A, and an absorption peak wavelength in a range of 640 to 670 nm shall be defined as B. Then, the cyan dye mixture with a little change in the color contains only a component showing a value B/A of 1 or less.

The phthalocyanine-based coloring material involves another problem, that is, the occurrence of a metallic luster resulting from a high aggregation property of the coloring material, referred to as a bronze phenomenon. When the bronze phenomenon occurs in a recorded matter, the optical reflectance property of the recorded matter changes. As a result, the color developability and hue of an image remarkably change, with the result that a remarkable reduction in image quality occurs. The bronze phenomenon is considered to occur as a result of the aggregation of the coloring material on the surface of a recording medium due to, for example, the high aggregation properties of the coloring material in ink and a reduction in permeability of the ink into the recording medium when the ink is applied to the recording medium. In particular, a coloring material having introduced in a molecule thereof an amino group for the purpose of improving environmental gas resistance, or ink containing a coloring material having low solubility in water tends to cause a remarkable bronze phenomenon.

For instance, Japanese Patent No. 2942319 proposes a specific phthalocyanine-based coloring material is used to improve environmental gas resistance. The use of the specific phthalocyanine-based coloring material provides environmental gas resistance which is one of concern in the phthalocyanine-based coloring material.

DISCLOSURE OF THE INVENTION

However, as described above, a phthalocyanine-based coloring material tends to cause a remarkable bronze phenomenon when its environmental gas resistance is improved. In other words, it is a fact that compatibility between an environmental gas resistance and bronze resistance has not yet been achieved. For information, the above described Japanese Patent Laid-Open No. 2004-323605 refers to the bronze phenomenon but does not describe a specific method for balancing the environmental gas resistance with the bronze resistance. On the other hand, the above described Japanese Patent No. 2942319 refers to the environmental gas resistance but does not describe the bronze phenomenon.

Accordingly, an object of the present invention is to provide an ink which has superior color developability, has high environmental gas resistance, and forms an image having superior bronze resistance.

Another object of the present invention is to provide a recording method, a recording unit, an ink cartridge and an ink jet recording apparatus, all of which employ the above described ink.

The present inventors researched a method for achieving the above described object according to the present invention. As a result, the present inventors have found that an ink having high color developability can be obtained by using a phthalocyanine-based coloring material having a particular structure. Furthermore, the present inventors have found that an ink which satisfies a predetermined condition shows excellent environmental gas resistance, and provides an effect of inhibiting a bronze phenomenon from occurring. The present invention was accomplished on the basis of these findings.

Specifically, an ink according to the present invention, which comprises at least a coloring material, is one wherein: the coloring material comprises a compound represented by a following general formula (I) or a salt thereof; and the maximum absorption wavelengths obtained by measuring an absorbance of a liquid prepared by diluting 2,000 times the ink by mass with 90 mass % of N,N-dimethylformamide aqueous solution are respectively in a range of 580 nm or more and 640 nm or less and in a range of 650 nm or more and 700 nm or less; and a ratio B/A of 0.75 or more and 0.90 or less, wherein A is an absorbance at a maximum absorption wavelength in the range of 580 nm or more and 640 nm or less, and B is an absorbance at the maximum absorption wavelength in a range of 650 nm or more and 700 nm or less:

substituent in at least one of 3-position and 3'-position in at least one benzene ring.

An ink jet recording method according to another aspect of the present invention is one wherein the ink having the above described composition is used as ink for the ink jet recording method comprising ejecting an ink by ink jet method to perform recording on a recording medium.

An ink cartridge according to another aspect of the present invention is one wherein the ink having the above described composition is used as ink for the ink cartridge provided with an ink storage portion for storing the ink.

A recording unit according to another aspect of the present invention is one wherein the ink having the above described composition is used as ink for the recording unit provided with an ink storage portion for storing the ink and a recording head for ejecting the ink.

An ink jet recording apparatus according to another aspect of the present invention is one wherein the ink having the above described composition is used as ink for the ink jet recording apparatus provided with an ink storage portion for storing ink and a recording head for ejecting the ink.

General formula (I)

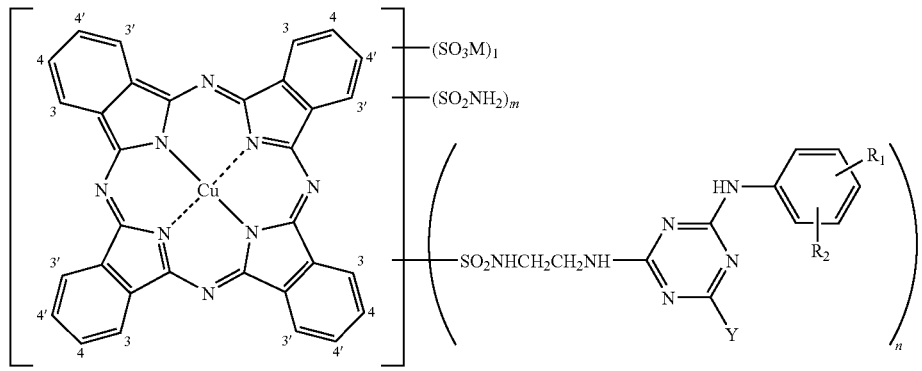

Figure 8:
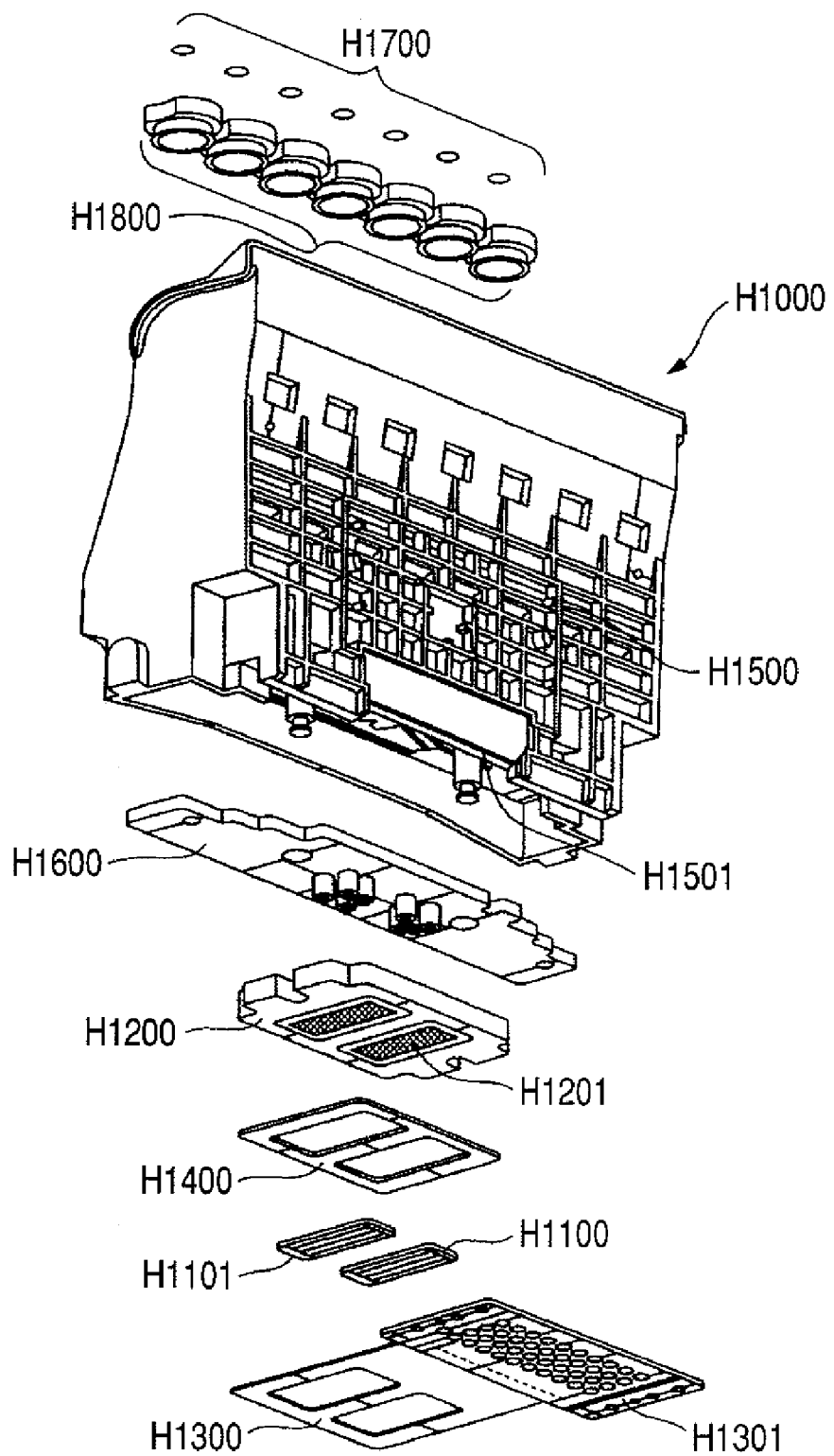
Figure 9:
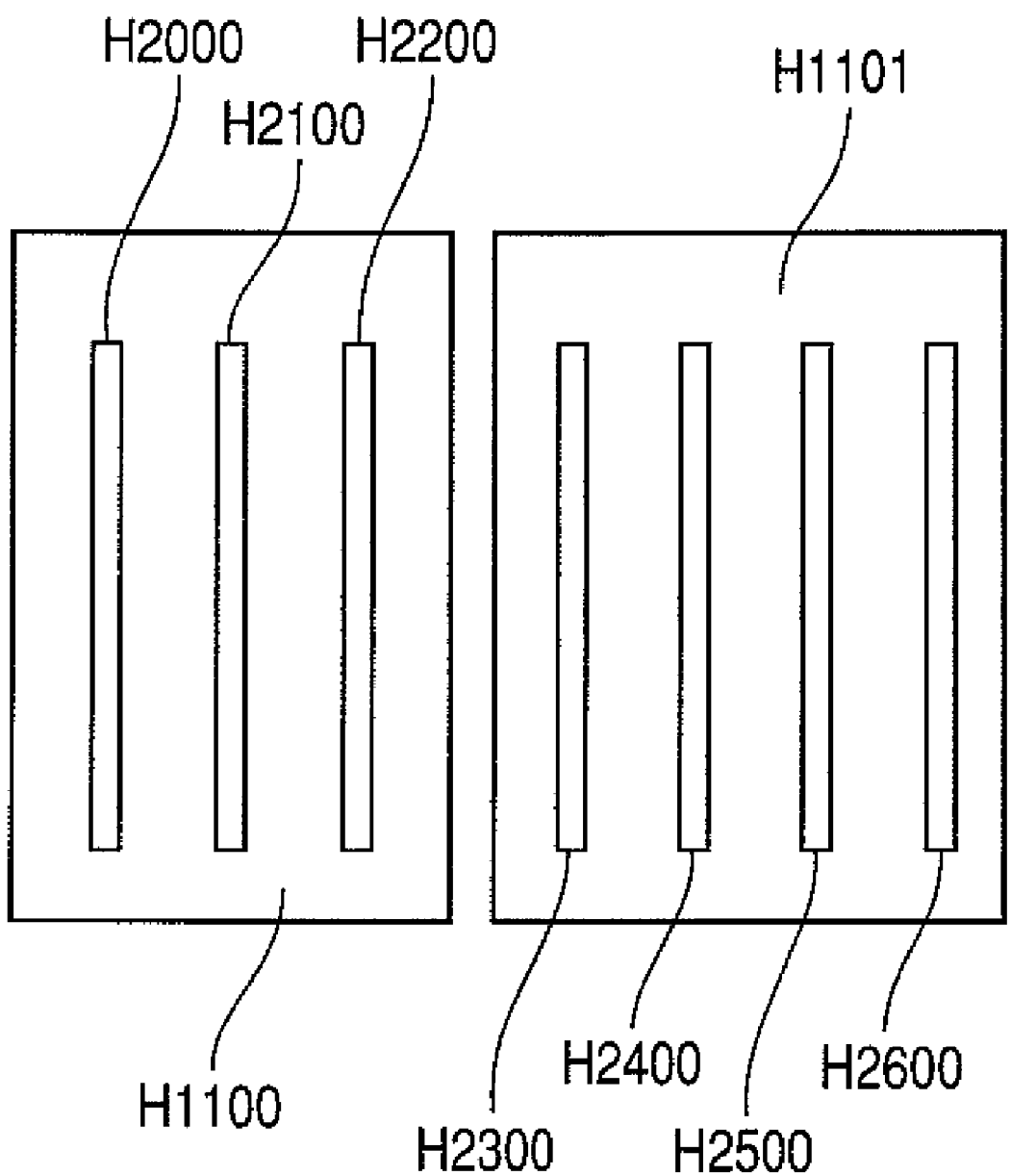
Figure 10:
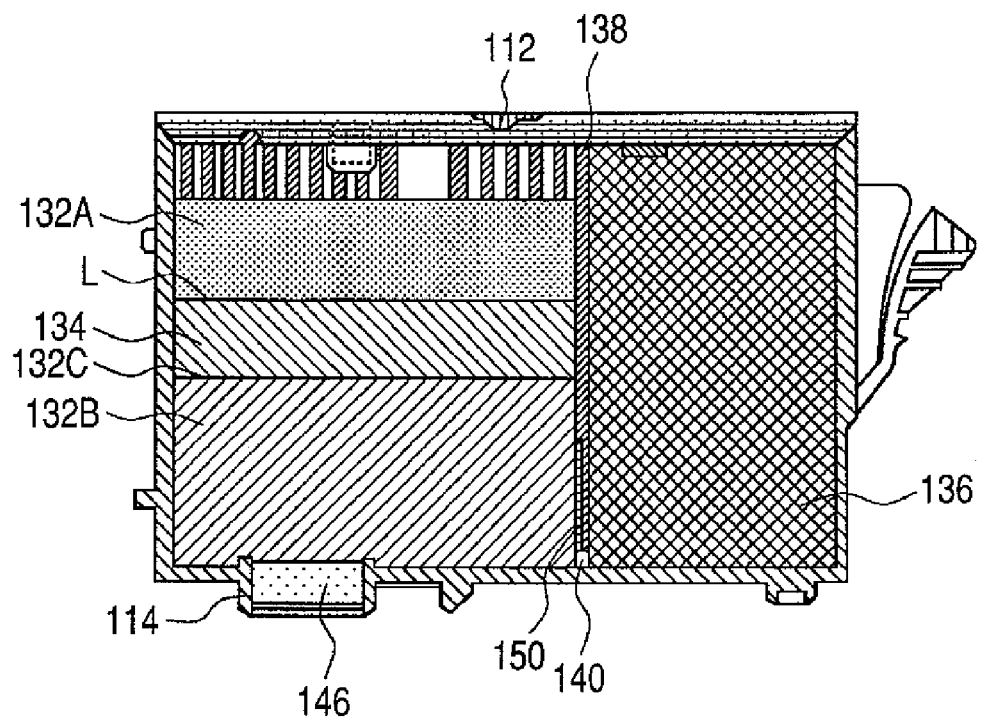
Figure 11:
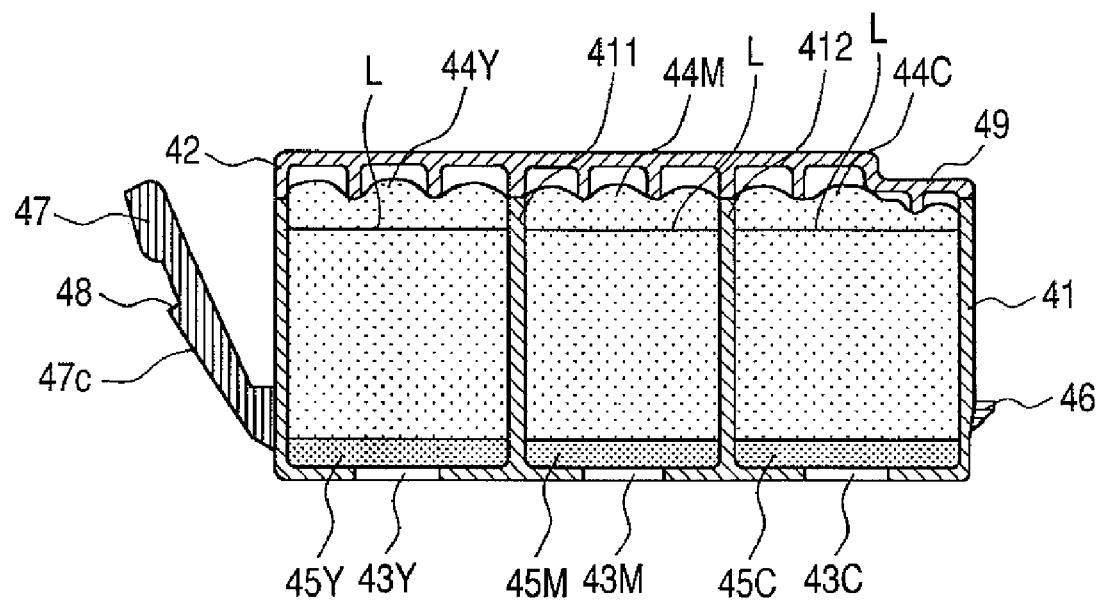
Figure 12:
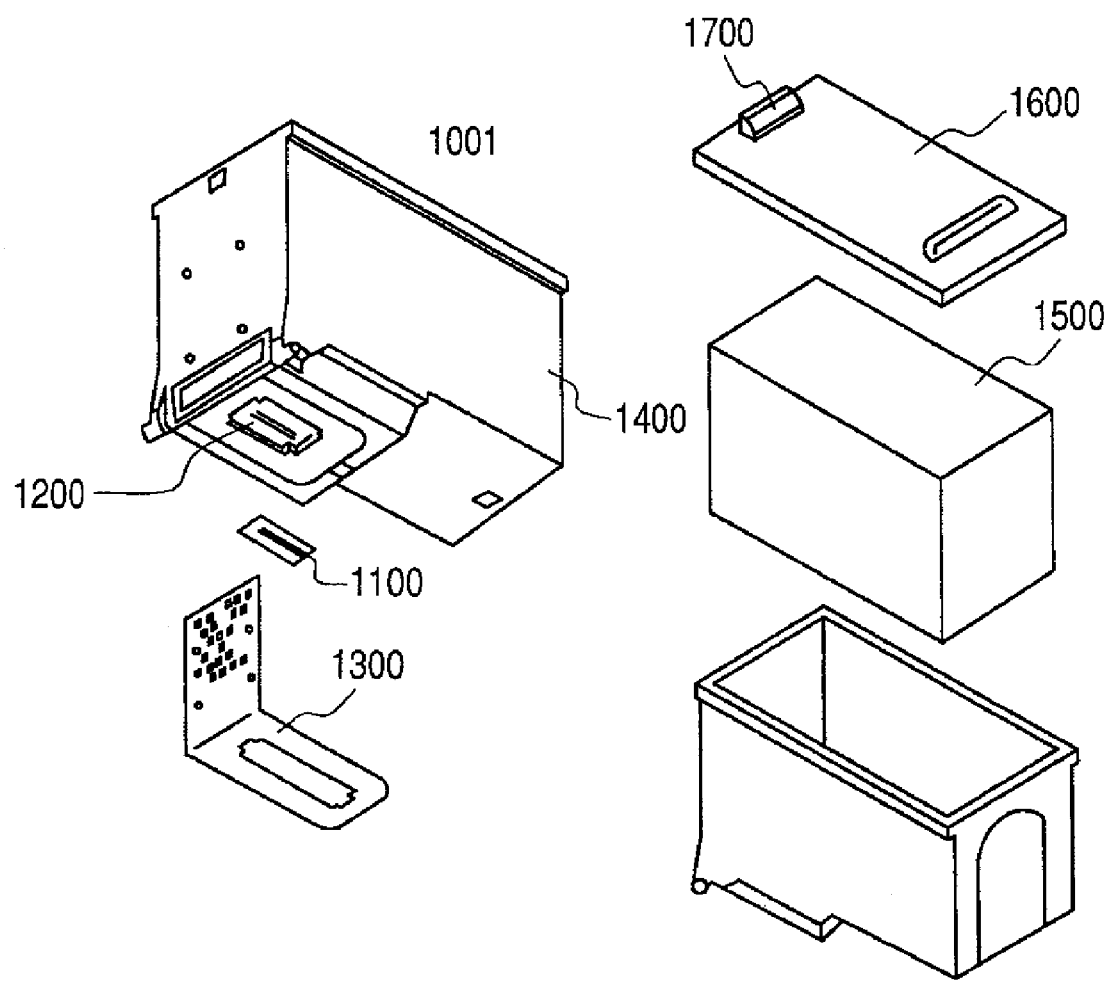
Figure 13:
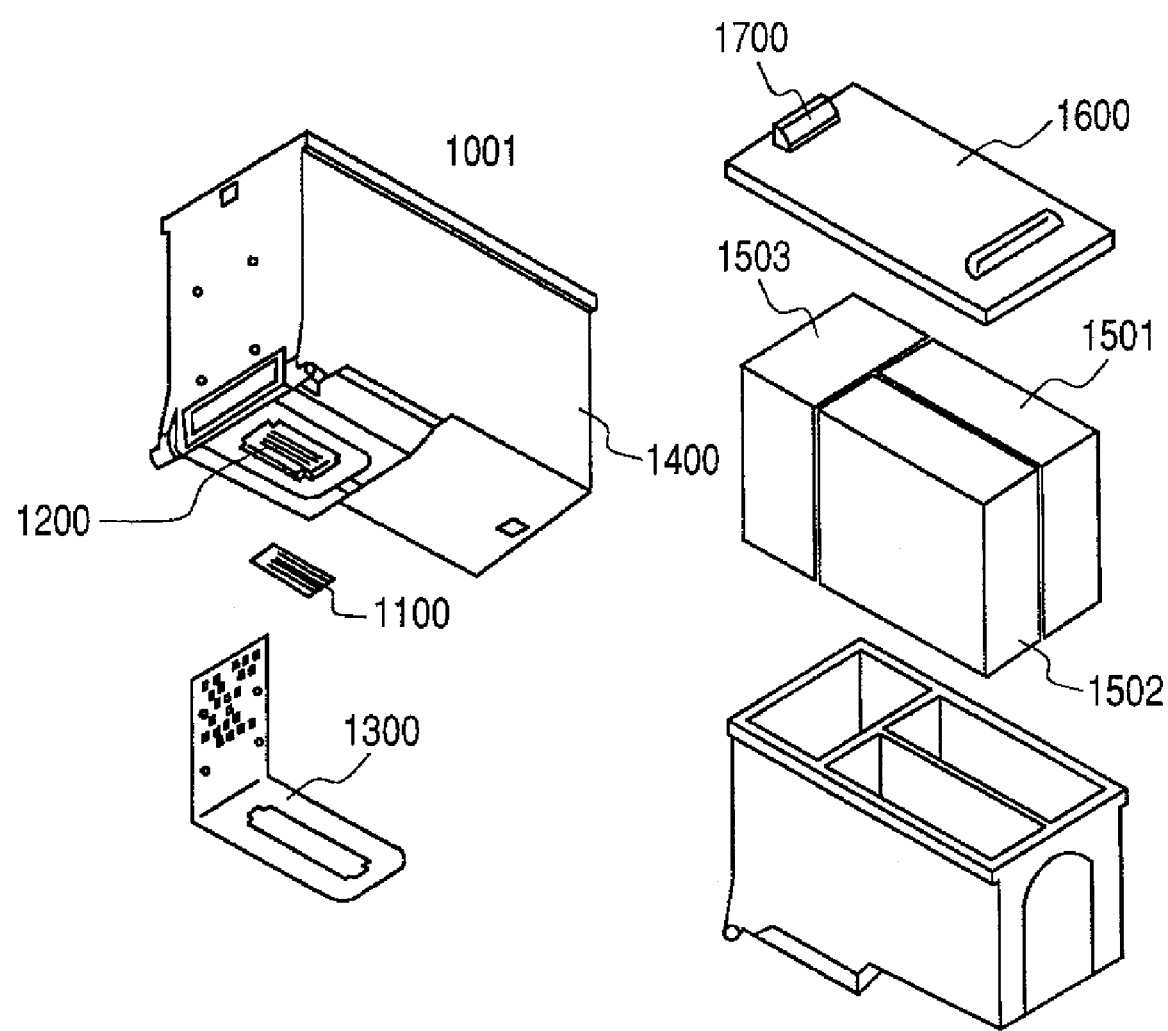
Figure 14:
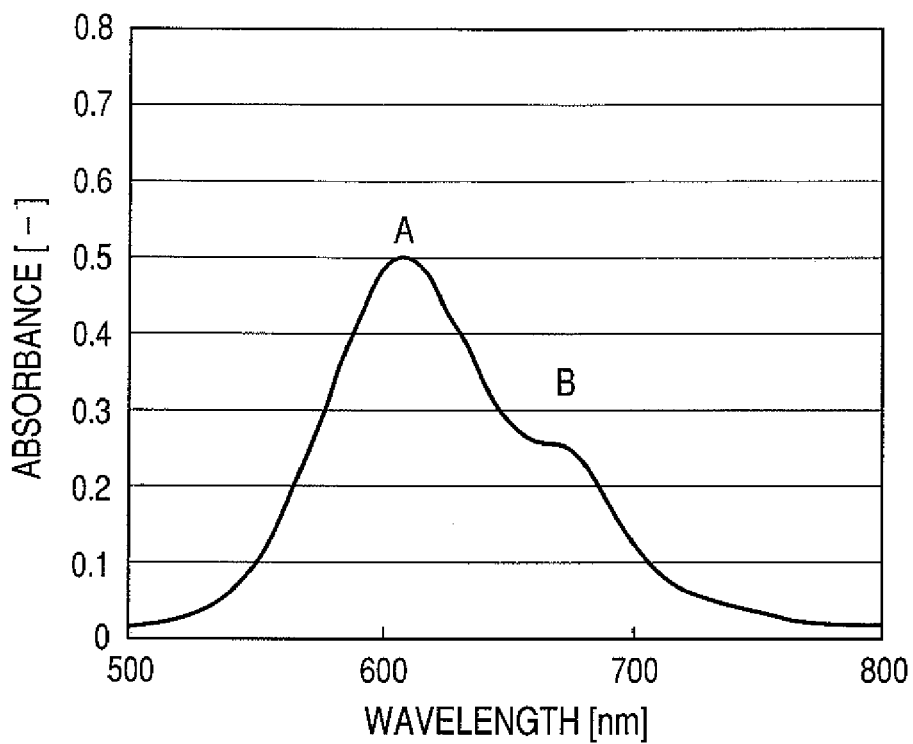
Figure 15:
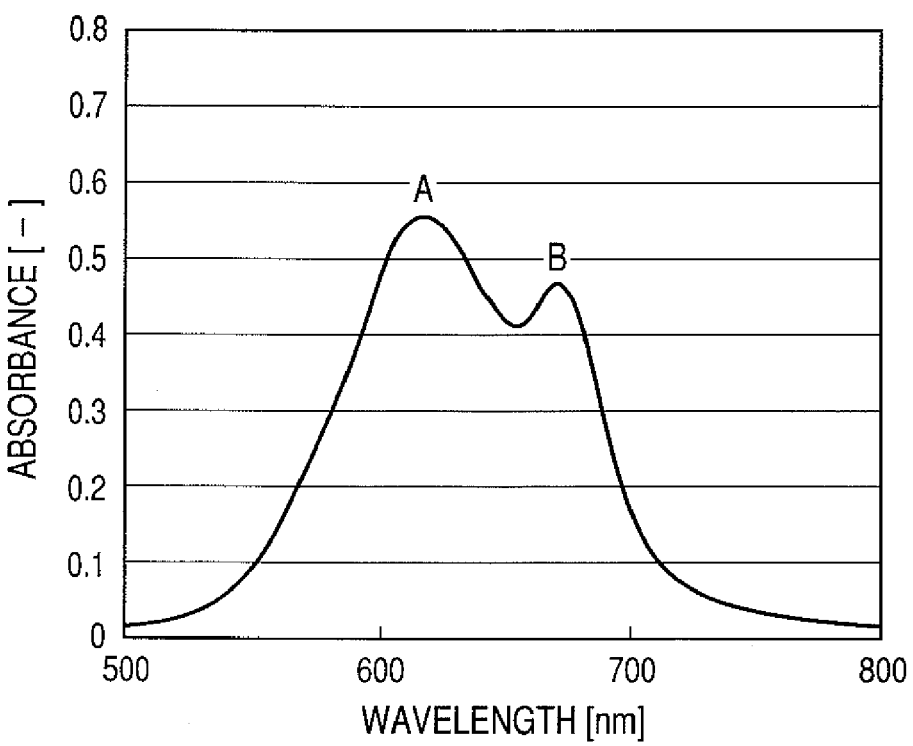
Figure 16:
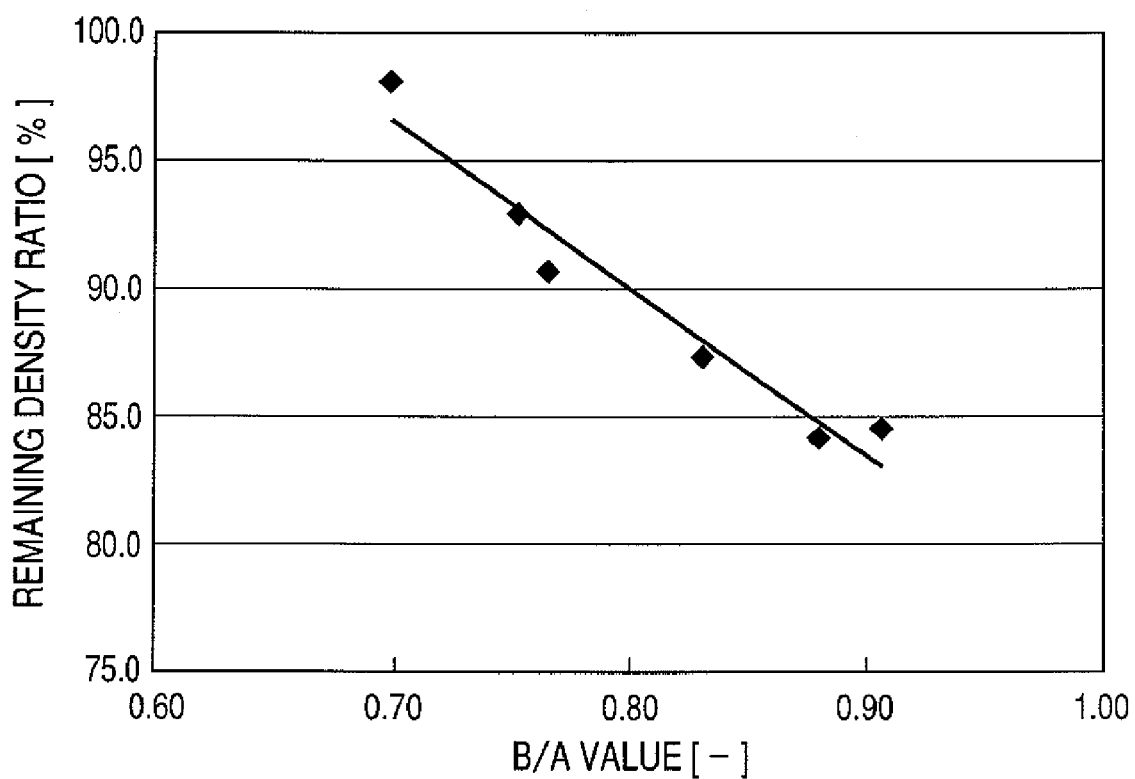

wherein M represents an alkali metal or ammonium; $R_1$ and $R_2$ each independently represents a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=2 to 4), where the copper phthalocyanine possesses a FIG. 8 is an exploded perspective view of a head cartridge;

FIG. 9 is a front view showing a recording element substrate in a head cartridge;

FIG. 10 is a schematic explanatory drawing of a liquid storage container;

FIG. 11 is a schematic explanatory drawing of a liquid storage container;

FIG. 12 is an exploded view of a recording head;

FIG. 13 is an exploded view of a recording head;

FIG. 14 is a graph showing an absorption spectrum for an aqueous solution of a phthalocyanine-based coloring material;

FIG. 15 is a graph showing an absorption spectrum for a liquid having a phthalocyanine-based coloring material dissolved in a solvent mainly containing N,N-dimethylformamide; and FIG. 16 is a graph showing a relationship between a value B/A and environmental gas resistance (remaining density ratio).

BEST MODE FOR CARRYING OUT THE INVENTION

Hereinafter, the present invention will be described in more detail by way of preferred embodiments.

The present invention shows an effect on general ink and a general recorded matter with the use of the ink, and shows a particularly remarkable effect preferably when being used for an ink of an ink jet recording apparatus. For this reason, in the next place, a preferred embodiment will be described in the case when using an ink according to the present invention as ink for an ink jet recording apparatus (which may be merely called the ink hereafter).

In the present invention, when a coloring material is a salt, the salt is dissociated to ions in ink, but this state is represented by using the phrase "contains a salt" for convenience.

In general, a phthalocyanine-based coloring material is a mixture consisting of compounds having a plurality of structures, and characteristics of the coloring material depend on total characteristics of these molecular structures. For this reason, the present inventors researched a method of stabilizing the characteristics of the phthalocyanine-based coloring material described in the above described Japanese Patent Application Laid-Open No. 2004-323605 or Japanese Patent No. 2942319. However, it has been difficult to impart both of bronze resistance and high color developability to the phthalocyanine-based coloring material while imparting excellent environmental gas resistance to it.

Then, the present inventors researched a method for providing an ink which contains a phthalocyanine-based coloring material, shows high color developability, and further shows high levels of both an environmental gas resistance and a bronze resistance. Specifically, the present inventors conducted various studies on a structure of the phthalocyanine-based coloring material which was considered to possibly acquire high color developability and high levels of both of the environmental gas resistance and the bronze resistance. As a result, the present inventors have found that an ink which has high color developability and further shows high levels of both an environmental gas resistance and a bronze resistance can be attained by using a phthalocyanine-based coloring material having a particular structure.

As a result of further research, the present inventors have found that first of all, characteristics of a phthalocyanine-based coloring material having a structure capable of showing high color developability are affected by the behavior of molecules in a non-associated state when such a coloring material exists on a recording medium. Specifically, the present inventors have found that when the coloring material with the particular structure exists on a recording medium, and shows a wavelength range originating in the non-associated state, it shows higher absorption, and as a result, provides high color developability.

Furthermore, the present inventors have found that characteristics of a phthalocyanine-based coloring material having such a particular structure as to show both an environmental gas resistance and a bronze resistance greatly depends on a state of molecules. Specifically, the present inventors have found that the existence of molecules in a non-associated state dominates characteristics of the coloring material in an aqueous solution, whereas molecules in an associated state are more dominant for the characteristics of the coloring material, in the aqueous solution in which a certain type of a water-soluble organic solvent coexists.

There are two measuring methods of indicating an index as to how much a phthalocyanine-based coloring material is in an associated state and in a non-associated state. One is a method of determining a ratio of one absorbance of maximum absorption wavelengths in a visible light range to the other, in a spectrogram obtained by measuring the absorbance of the phthalocyanine-based coloring material with the use of a spectrophotometer. (Generally, a peak in a short wavelength side originates in an associated state and a peak in a long wavelength side originates in a non-associated state). The other includes a method of measuring a dispersed distance among molecular aggregates with the use of a small-angle X-ray scattering instrument. (The larger is a value of the dispersed distance, the more associated are the molecular aggregates).

Thus, the present inventors researched an associated state and non-associated state of a phthalocyanine-based coloring material having a particular structure in various water-soluble organic solvents in detail, on the basis of the above described two measurement principles. As a result, the present inventors found that particularly N,N-dimethylformamide (DMF) among water-soluble organic solvents most remarkably shows characteristics of the coloring material.

(Coloring Material)

The ink according to the present invention must contain a compound represented by general formula (I), or a salt thereof. The compound represented by the following general formula (I) or the salt thereof is a phthalocyanine derivative characterized in that it has a cyan hue and is excellent in environmental gas resistance.

General formula (I)

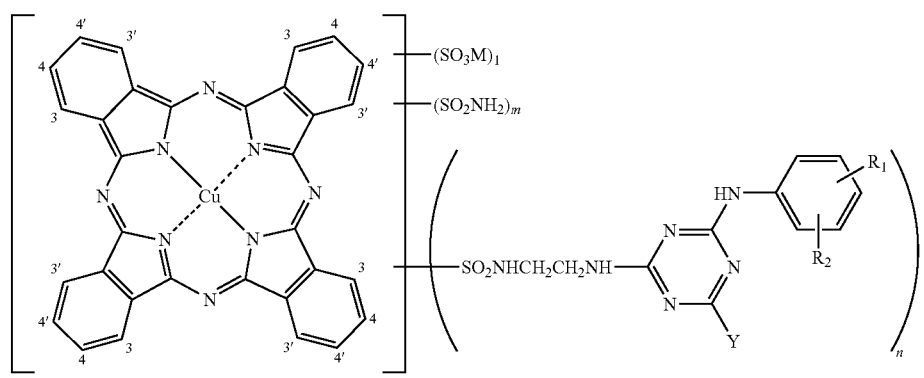

(In general formula (I), wherein M represents an alkali metal or ammonium; $R_1$ and $R_2$ each independently represents a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=2 to 4), where the copper phthalocyanine possesses a substituent in at least one of 3-position and 3'-position in at least one benzene ring).

A coloring material to be used in the present invention is a phthalocyanine derivative which has a sulfonic group (—$SO_3M$), an unsubstituted sulfamoyl group (—$SO_2NH_2$) and a substituted sulfamoyl group (group represented by general formula (III)) selectively introduced into a phthalocyanine skeleton. The present inventors found that a recorded matter obtained by means of ink containing such compound shows extremely excellent environmental gas resistance. In the present invention, a compound represented by general formula (I) preferably satisfies l=0, namely, the compound preferably has no sulfonic group as a substituent of the phthalocyanine skeleton. Furthermore, the compound preferably satisfies m+n=2 to 4, at this time.

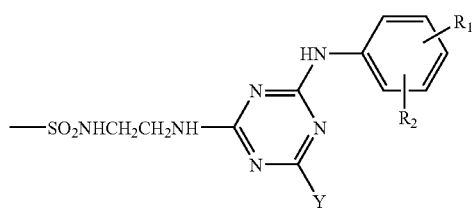

General formula (III)

Preferable examples of the substituted sulfamoyl group represented by the general formula (III) are shown below. Of course, the substituted sulfamoyl group to be used in the present invention is not limited to them. The substituted sulfamoyl group represented by the general formula (III) is represented by the form of a free acid.

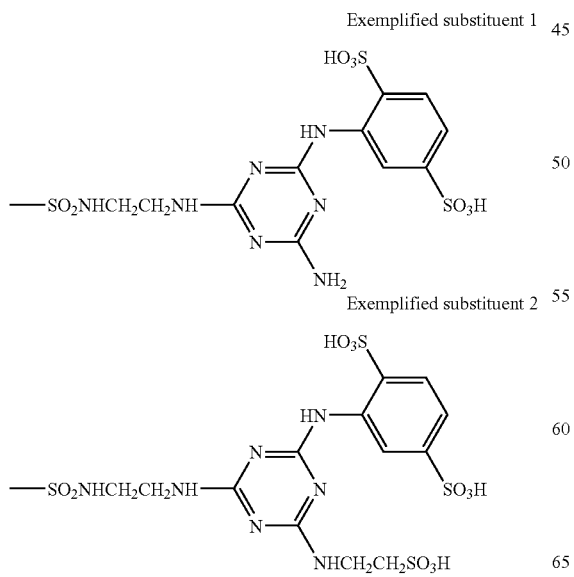

Exemplified substituent 1

Exemplified substituent 2

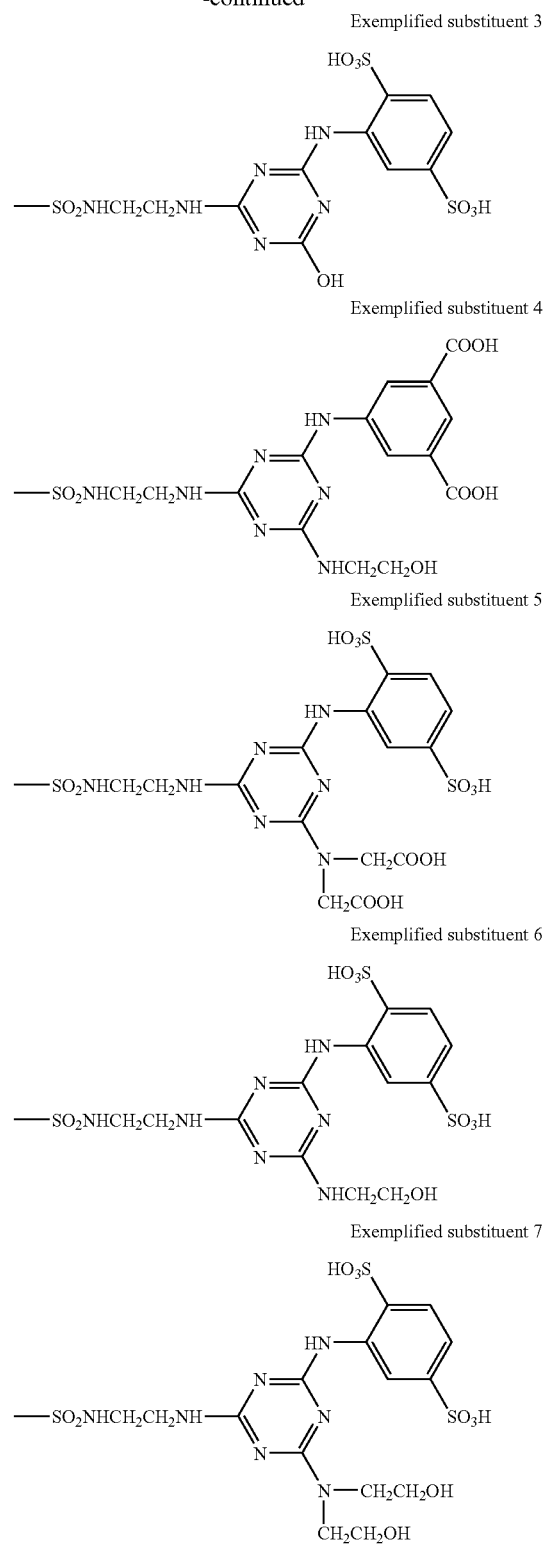

Exemplified substituent 3

Exemplified substituent 4

Exemplified substituent 5

Exemplified substituent 6

Exemplified substituent 7

Of those, a compound substituted by Exemplified Substituent 1 above, that is, a compound represented by the following general formula (II) or a salt thereof is most preferable from the viewpoint of its balance between color developability and environmental gas resistance.

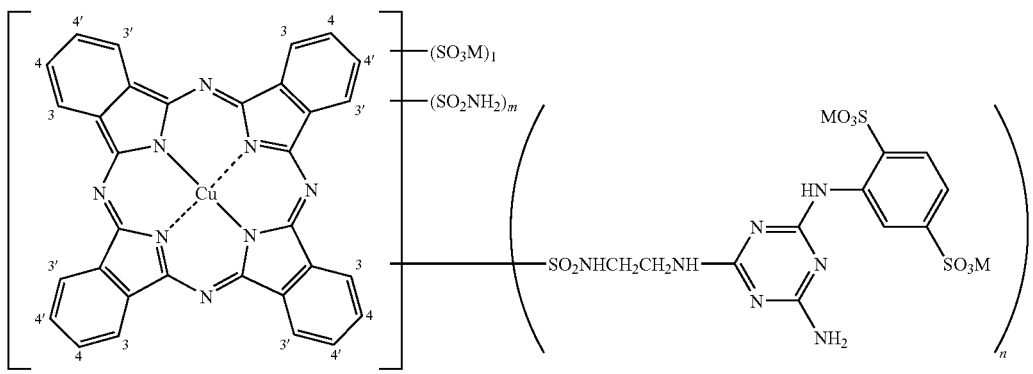

General formula (II)

(In general formula (II), M represents an alkali metal or ammonium; l represents 0 to 2, m represents 1 to 3, and n represents 1 to 3 (provided that l+m+n=2 to 4); where the copper phthalocyanine possesses a substituent in at least one of 3-position and 3'-position in at least one benzene ring).

A compound to be used in the present invention is a copper phthalocyanine that has a substituent in at least one of 3-position and 3'-position in at least one benzene ring, furthermore the copper phthalocyanine may have a substituent in at least one of 4-position and 4'-position in at least one benzene ring, as is represented by general formula (I). Accordingly, there are many isomers that have the different number of unsubstituted sulfamoyl groups ($-SO_2NH_2$) and substituted sulfamoyl groups (group represented by general formula (III)) which are substituents to substitute for an element or a group in a phthalocyanine skeleton, of which one part is shown in Tables 1 to 3 described below. The compound represented by general formula (I) or a salt thereof is a mixture of those isomers, and even compounds having the same structure are found to have considerably different properties depending on the number and kinds of their isomers. A difference in aggregation properties between coloring materials themselves can be given as one example of the properties.

TABLE 1

The number of substituents, the positions of substituents, and the kinds of isomers for m = 1, n = 3, m + n = 4

| Unsubstituted sulfamoyl group | | | | Substituted sulfamoyl group | | | |
|---|---|---|---|---|---|---|---|
| 3 position | 3' position | 4 position | 4' position | 3 position | 3' position | 4 position | 4' position |
| 1 | 0 | 0 | 0 | 3 | 0 | 0 | 0 |
| 1 | 0 | 0 | 0 | 2 | 1 | 0 | 0 |
| 1 | 0 | 0 | 0 | 2 | 0 | 1 | 0 |
| 1 | 0 | 0 | 0 | 2 | 0 | 0 | 1 |
| 1 | 0 | 0 | 0 | 1 | 2 | 0 | 0 |
| 1 | 0 | 0 | 0 | 1 | 1 | 1 | 0 |
| 1 | 0 | 0 | 0 | 1 | 1 | 0 | 1 |
| 1 | 0 | 0 | 0 | 1 | 0 | 2 | 0 |
| 1 | 0 | 0 | 0 | 1 | 0 | 1 | 1 |
| 1 | 0 | 0 | 0 | 1 | 0 | 0 | 2 |
| 1 | 0 | 0 | 0 | 0 | 3 | 0 | 0 |
| 1 | 0 | 0 | 0 | 0 | 2 | 1 | 0 |
| 1 | 0 | 0 | 0 | 0 | 2 | 0 | 1 |
| 1 | 0 | 0 | 0 | 0 | 1 | 2 | 0 |
| 1 | 0 | 0 | 0 | 0 | 1 | 0 | 2 |
| 1 | 0 | 0 | 0 | 0 | 0 | 3 | 0 |

TABLE 1-continued

The number of substituents, the positions of substituents, and the kinds of isomers for m = 1, n = 3, m + n = 4

| Unsubstituted sulfamoyl group | | | | Substituted sulfamoyl group | | | |
|---|---|---|---|---|---|---|---|
| 3 position | 3' position | 4 position | 4' position | 3 position | 3' position | 4 position | 4' position |
| 1 | 0 | 0 | 0 | 0 | 0 | 2 | 1 |
| 1 | 0 | 0 | 0 | 0 | 0 | 1 | 2 |
| 1 | 0 | 0 | 0 | 0 | 0 | 0 | 3 |
| 0 | 1 | 0 | 0 | 3 | 0 | 0 | 0 |
| 0 | 1 | 0 | 0 | 2 | 1 | 0 | 0 |
| 0 | 1 | 0 | 0 | 2 | 0 | 1 | 0 |
| 0 | 1 | 0 | 0 | 2 | 0 | 0 | 1 |
| 0 | 1 | 0 | 0 | 1 | 2 | 0 | 0 |
| 0 | 1 | 0 | 0 | 1 | 1 | 1 | 0 |
| 0 | 1 | 0 | 0 | 1 | 1 | 0 | 1 |
| 0 | 1 | 0 | 0 | 1 | 0 | 2 | 0 |
| 0 | 1 | 0 | 0 | 1 | 0 | 1 | 1 |
| 0 | 1 | 0 | 0 | 1 | 0 | 0 | 2 |
| 0 | 1 | 0 | 0 | 0 | 3 | 0 | 0 |
| 0 | 1 | 0 | 0 | 0 | 2 | 1 | 0 |
| 0 | 1 | 0 | 0 | 0 | 2 | 0 | 1 |
| 0 | 1 | 0 | 0 | 0 | 1 | 2 | 0 |
| 0 | 1 | 0 | 0 | 0 | 1 | 0 | 2 |
| 0 | 1 | 0 | 0 | 0 | 0 | 3 | 0 |
| 0 | 1 | 0 | 0 | 0 | 0 | 2 | 1 |
| 0 | 1 | 0 | 0 | 0 | 0 | 1 | 2 |
| 0 | 1 | 0 | 0 | 0 | 0 | 0 | 3 |
| 0 | 0 | 1 | 0 | 3 | 0 | 0 | 0 |
| 0 | 0 | 1 | 0 | 2 | 1 | 0 | 0 |
| 0 | 0 | 1 | 0 | 2 | 0 | 1 | 0 |
| 0 | 0 | 1 | 0 | 2 | 0 | 0 | 1 |
| 0 | 0 | 1 | 0 | 1 | 2 | 0 | 0 |
| 0 | 0 | 1 | 0 | 1 | 1 | 1 | 0 |
| 0 | 0 | 1 | 0 | 1 | 1 | 0 | 1 |
| 0 | 0 | 1 | 0 | 1 | 0 | 2 | 0 |
| 0 | 0 | 1 | 0 | 1 | 0 | 1 | 1 |
| 0 | 0 | 1 | 0 | 1 | 0 | 0 | 2 |
| 0 | 0 | 1 | 0 | 0 | 3 | 0 | 0 |
| 0 | 0 | 1 | 0 | 0 | 2 | 1 | 0 |
| 0 | 0 | 1 | 0 | 0 | 2 | 0 | 1 |
| 0 | 0 | 1 | 0 | 0 | 1 | 2 | 0 |
| 0 | 0 | 1 | 0 | 0 | 1 | 0 | 2 |
| 0 | 0 | 1 | 0 | 0 | 0 | 3 | 0 |
| 0 | 0 | 1 | 0 | 0 | 0 | 2 | 1 |
| 0 | 0 | 1 | 0 | 0 | 0 | 1 | 2 |
| 0 | 0 | 1 | 0 | 0 | 0 | 0 | 3 |
| 0 | 0 | 0 | 1 | 3 | 0 | 0 | 0 |
| 0 | 0 | 0 | 1 | 2 | 1 | 0 | 0 |
| 0 | 0 | 0 | 1 | 2 | 0 | 1 | 0 |
| 0 | 0 | 0 | 1 | 2 | 0 | 0 | 1 |

TABLE 1-continued

The number of substituents, the positions of substituents, and the kinds of isomers for m = 1, n = 3, m + n = 4

| Unsubstituted sulfamoyl group | | | | Substituted sulfamoyl group | | | |
|---|---|---|---|---|---|---|---|
| 3 position | 3' position | 4 position | 4' position | 3 position | 3' position | 4 position | 4' position |
| 0 | 0 | 0 | 1 | 1 | 2 | 0 | 0 |
| 0 | 0 | 0 | 1 | 1 | 1 | 1 | 0 |
| 0 | 0 | 0 | 1 | 1 | 1 | 0 | 1 |
| 0 | 0 | 0 | 1 | 1 | 0 | 2 | 0 |
| 0 | 0 | 0 | 1 | 1 | 0 | 1 | 1 |
| 0 | 0 | 0 | 1 | 1 | 0 | 0 | 2 |
| 0 | 0 | 0 | 1 | 0 | 3 | 0 | 0 |
| 0 | 0 | 0 | 1 | 0 | 2 | 1 | 0 |
| 0 | 0 | 0 | 1 | 0 | 2 | 0 | 1 |
| 0 | 0 | 0 | 1 | 0 | 1 | 2 | 0 |
| 0 | 0 | 0 | 1 | 0 | 1 | 0 | 2 |
| 0 | 0 | 0 | 1 | 0 | 0 | 3 | 0 |
| 0 | 0 | 0 | 1 | 0 | 0 | 2 | 1 |
| 0 | 0 | 0 | 1 | 0 | 0 | 1 | 2 |
| 0 | 0 | 0 | 1 | 0 | 0 | 0 | 3 |

TABLE 2

The number of substituents, the positions of substituents, and the kinds of isomers (for m = 2, n = 2, m + n = 4)

| Unsubstituted sulfamoyl group | | | | Substituted sulfamoyl group | | | |
|---|---|---|---|---|---|---|---|
| 3 position | 3' position | 4 position | 4' position | 3 position | 3' position | 4 position | 4' position |
| 2 | 0 | 0 | 0 | 2 | 0 | 0 | 0 |
| 2 | 0 | 0 | 0 | 1 | 1 | 0 | 0 |
| 2 | 0 | 0 | 0 | 1 | 0 | 1 | 0 |
| 2 | 0 | 0 | 0 | 1 | 0 | 0 | 1 |
| 2 | 0 | 0 | 0 | 0 | 2 | 0 | 0 |
| 2 | 0 | 0 | 0 | 0 | 1 | 1 | 0 |
| 2 | 0 | 0 | 0 | 0 | 1 | 0 | 1 |
| 2 | 0 | 0 | 0 | 0 | 0 | 2 | 0 |
| 2 | 0 | 0 | 0 | 0 | 0 | 1 | 1 |
| 2 | 0 | 0 | 0 | 0 | 0 | 0 | 2 |
| 1 | 1 | 0 | 0 | 2 | 0 | 0 | 0 |
| 1 | 1 | 0 | 0 | 1 | 1 | 0 | 0 |
| 1 | 1 | 0 | 0 | 1 | 0 | 1 | 0 |
| 1 | 1 | 0 | 0 | 1 | 0 | 0 | 1 |
| 1 | 1 | 0 | 0 | 0 | 2 | 0 | 0 |
| 1 | 1 | 0 | 0 | 0 | 1 | 1 | 0 |
| 1 | 1 | 0 | 0 | 0 | 1 | 0 | 1 |
| 1 | 1 | 0 | 0 | 0 | 0 | 2 | 0 |
| 1 | 1 | 0 | 0 | 0 | 0 | 1 | 1 |
| 1 | 1 | 0 | 0 | 0 | 0 | 0 | 2 |
| 1 | 0 | 1 | 0 | 2 | 0 | 0 | 0 |
| 1 | 0 | 1 | 0 | 1 | 1 | 0 | 0 |
| 1 | 0 | 1 | 0 | 1 | 0 | 1 | 0 |
| 1 | 0 | 1 | 0 | 1 | 0 | 0 | 1 |
| 1 | 0 | 1 | 0 | 0 | 2 | 0 | 0 |
| 1 | 0 | 1 | 0 | 0 | 1 | 1 | 0 |
| 1 | 0 | 1 | 0 | 0 | 1 | 0 | 1 |
| 1 | 0 | 1 | 0 | 0 | 0 | 2 | 0 |
| 1 | 0 | 1 | 0 | 0 | 0 | 1 | 1 |
| 1 | 0 | 1 | 0 | 0 | 0 | 0 | 2 |
| 1 | 0 | 0 | 1 | 2 | 0 | 0 | 0 |

TABLE 2-continued

The number of substituents, the positions of substituents, and the kinds of isomers (for m = 2, n = 2, m + n = 4)

| Unsubstituted sulfamoyl group | | | | Substituted sulfamoyl group | | | |
|---|---|---|---|---|---|---|---|
| 3 position | 3' position | 4 position | 4' position | 3 position | 3' position | 4 position | 4' position |
| 1 | 0 | 0 | 1 | 1 | 1 | 0 | 0 |
| 1 | 0 | 0 | 1 | 1 | 0 | 1 | 0 |
| 1 | 0 | 0 | 1 | 1 | 0 | 0 | 1 |
| 1 | 0 | 0 | 1 | 0 | 2 | 0 | 0 |
| 1 | 0 | 0 | 1 | 0 | 1 | 1 | 0 |
| 1 | 0 | 0 | 1 | 0 | 1 | 0 | 1 |
| 1 | 0 | 0 | 1 | 0 | 0 | 2 | 0 |
| 1 | 0 | 0 | 1 | 0 | 0 | 1 | 1 |
| 1 | 0 | 0 | 1 | 0 | 0 | 0 | 2 |
| 0 | 2 | 0 | 0 | 2 | 0 | 0 | 0 |
| 0 | 2 | 0 | 0 | 1 | 1 | 0 | 0 |
| 0 | 2 | 0 | 0 | 1 | 0 | 1 | 0 |
| 0 | 2 | 0 | 0 | 1 | 0 | 0 | 1 |
| 0 | 2 | 0 | 0 | 0 | 2 | 0 | 0 |
| 0 | 2 | 0 | 0 | 0 | 1 | 1 | 0 |
| 0 | 2 | 0 | 0 | 0 | 1 | 0 | 1 |
| 0 | 2 | 0 | 0 | 0 | 0 | 2 | 0 |
| 0 | 2 | 0 | 0 | 0 | 0 | 1 | 1 |
| 0 | 2 | 0 | 0 | 0 | 0 | 0 | 2 |
| 0 | 1 | 1 | 0 | 2 | 0 | 0 | 0 |
| 0 | 1 | 1 | 0 | 1 | 1 | 0 | 0 |
| 0 | 1 | 1 | 0 | 1 | 0 | 1 | 0 |
| 0 | 1 | 1 | 0 | 1 | 0 | 0 | 1 |
| 0 | 1 | 1 | 0 | 0 | 2 | 0 | 0 |
| 0 | 1 | 1 | 0 | 0 | 1 | 1 | 0 |
| 0 | 1 | 1 | 0 | 0 | 1 | 0 | 1 |
| 0 | 1 | 1 | 0 | 0 | 0 | 2 | 0 |
| 0 | 1 | 1 | 0 | 0 | 0 | 1 | 1 |
| 0 | 1 | 1 | 0 | 0 | 0 | 0 | 2 |
| 0 | 1 | 0 | 1 | 2 | 0 | 0 | 0 |
| 0 | 1 | 0 | 1 | 1 | 1 | 0 | 0 |
| 0 | 1 | 0 | 1 | 1 | 0 | 1 | 0 |
| 0 | 1 | 0 | 1 | 1 | 0 | 0 | 1 |
| 0 | 1 | 0 | 1 | 0 | 2 | 0 | 0 |
| 0 | 1 | 0 | 1 | 0 | 1 | 1 | 0 |
| 0 | 1 | 0 | 1 | 0 | 1 | 0 | 1 |
| 0 | 1 | 0 | 1 | 0 | 0 | 2 | 0 |
| 0 | 1 | 0 | 1 | 0 | 0 | 1 | 1 |
| 0 | 1 | 0 | 1 | 0 | 0 | 0 | 2 |
| 0 | 0 | 2 | 0 | 2 | 0 | 0 | 0 |
| 0 | 0 | 2 | 0 | 1 | 1 | 0 | 0 |
| 0 | 0 | 2 | 0 | 1 | 0 | 1 | 0 |
| 0 | 0 | 2 | 0 | 1 | 0 | 0 | 1 |
| 0 | 0 | 2 | 0 | 0 | 2 | 0 | 0 |
| 0 | 0 | 2 | 0 | 0 | 1 | 1 | 0 |
| 0 | 0 | 2 | 0 | 0 | 1 | 0 | 1 |
| 0 | 0 | 2 | 0 | 0 | 0 | 2 | 0 |
| 0 | 0 | 2 | 0 | 0 | 0 | 1 | 1 |
| 0 | 0 | 2 | 0 | 0 | 0 | 0 | 2 |
| 0 | 0 | 1 | 1 | 2 | 0 | 0 | 0 |
| 0 | 0 | 1 | 1 | 1 | 1 | 0 | 0 |
| 0 | 0 | 1 | 1 | 1 | 0 | 1 | 0 |
| 0 | 0 | 1 | 1 | 1 | 0 | 0 | 1 |
| 0 | 0 | 1 | 1 | 0 | 2 | 0 | 0 |
| 0 | 0 | 1 | 1 | 0 | 1 | 1 | 0 |
| 0 | 0 | 1 | 1 | 0 | 1 | 0 | 1 |
| 0 | 0 | 1 | 1 | 0 | 0 | 2 | 0 |
| 0 | 0 | 1 | 1 | 0 | 0 | 1 | 1 |
| 0 | 0 | 1 | 1 | 0 | 0 | 0 | 2 |
| 0 | 0 | 0 | 2 | 2 | 0 | 0 | 0 |
| 0 | 0 | 0 | 2 | 1 | 1 | 0 | 0 |
| 0 | 0 | 0 | 2 | 1 | 0 | 1 | 0 |
| 0 | 0 | 0 | 2 | 1 | 0 | 0 | 1 |
| 0 | 0 | 0 | 2 | 0 | 2 | 0 | 0 |
| 0 | 0 | 0 | 2 | 0 | 1 | 1 | 0 |
| 0 | 0 | 0 | 2 | 0 | 1 | 0 | 1 |
| 0 | 0 | 0 | 2 | 0 | 0 | 2 | 0 |
| 0 | 0 | 0 | 2 | 0 | 0 | 1 | 1 |
| 0 | 0 | 0 | 2 | 0 | 0 | 0 | 2 |

TABLE 3

The number of substituents, the positions of substituents, and the kinds of isomers (for m = 3, n = 1, m + n = 4)

| Unsubstituted sulfamoyl group | | | | Substituted sulfamoyl group | | | |
|---|---|---|---|---|---|---|---|
| 3 position | 3' position | 4 position | 4' position | 3 position | 3' position | 4 position | 4' position |
| 3 | 0 | 0 | 0 | 1 | 0 | 0 | 0 |
| 3 | 0 | 0 | 0 | 0 | 1 | 0 | 0 |
| 3 | 0 | 0 | 0 | 0 | 0 | 1 | 0 |
| 3 | 0 | 0 | 0 | 0 | 0 | 0 | 1 |
| 2 | 1 | 0 | 0 | 1 | 0 | 0 | 0 |
| 2 | 1 | 0 | 0 | 0 | 1 | 0 | 0 |
| 2 | 1 | 0 | 0 | 0 | 0 | 1 | 0 |
| 2 | 1 | 0 | 0 | 0 | 0 | 0 | 1 |
| 2 | 0 | 1 | 0 | 1 | 0 | 0 | 0 |
| 2 | 0 | 1 | 0 | 0 | 1 | 0 | 0 |
| 2 | 0 | 1 | 0 | 0 | 0 | 1 | 0 |
| 2 | 0 | 1 | 0 | 0 | 0 | 0 | 1 |
| 2 | 0 | 0 | 1 | 1 | 0 | 0 | 0 |
| 2 | 0 | 0 | 1 | 0 | 1 | 0 | 0 |
| 2 | 0 | 0 | 1 | 0 | 0 | 1 | 0 |
| 2 | 0 | 0 | 1 | 0 | 0 | 0 | 1 |
| 1 | 2 | 0 | 0 | 1 | 0 | 0 | 0 |
| 1 | 2 | 0 | 0 | 0 | 1 | 0 | 0 |
| 1 | 2 | 0 | 0 | 0 | 0 | 1 | 0 |
| 1 | 2 | 0 | 0 | 0 | 0 | 0 | 1 |
| 1 | 1 | 1 | 0 | 1 | 0 | 0 | 0 |
| 1 | 1 | 1 | 0 | 0 | 1 | 0 | 0 |
| 1 | 1 | 1 | 0 | 0 | 0 | 1 | 0 |
| 1 | 1 | 1 | 0 | 0 | 0 | 0 | 1 |
| 1 | 1 | 0 | 1 | 1 | 0 | 0 | 0 |
| 1 | 1 | 0 | 1 | 0 | 1 | 0 | 0 |
| 1 | 1 | 0 | 1 | 0 | 0 | 1 | 0 |
| 1 | 1 | 0 | 1 | 0 | 0 | 0 | 1 |
| 1 | 0 | 2 | 0 | 1 | 0 | 0 | 0 |
| 1 | 0 | 2 | 0 | 0 | 1 | 0 | 0 |
| 1 | 0 | 2 | 0 | 0 | 0 | 1 | 0 |
| 1 | 0 | 2 | 0 | 0 | 0 | 0 | 1 |
| 1 | 0 | 1 | 1 | 1 | 0 | 0 | 0 |
| 1 | 0 | 1 | 1 | 0 | 1 | 0 | 0 |
| 1 | 0 | 1 | 1 | 0 | 0 | 1 | 0 |
| 1 | 0 | 1 | 1 | 0 | 0 | 0 | 1 |
| 1 | 0 | 0 | 2 | 1 | 0 | 0 | 0 |
| 1 | 0 | 0 | 2 | 0 | 1 | 0 | 0 |
| 1 | 0 | 0 | 2 | 0 | 0 | 1 | 0 |
| 1 | 0 | 0 | 2 | 0 | 0 | 0 | 1 |
| 0 | 3 | 0 | 0 | 1 | 0 | 0 | 0 |
| 0 | 3 | 0 | 0 | 0 | 1 | 0 | 0 |
| 0 | 3 | 0 | 0 | 0 | 0 | 1 | 0 |
| 0 | 3 | 0 | 0 | 0 | 0 | 0 | 1 |
| 0 | 2 | 1 | 0 | 1 | 0 | 0 | 0 |
| 0 | 2 | 1 | 0 | 0 | 1 | 0 | 0 |
| 0 | 2 | 1 | 0 | 0 | 0 | 1 | 0 |
| 0 | 2 | 1 | 0 | 0 | 0 | 0 | 1 |
| 0 | 2 | 0 | 1 | 1 | 0 | 0 | 0 |
| 0 | 2 | 0 | 1 | 0 | 1 | 0 | 0 |
| 0 | 2 | 0 | 1 | 0 | 0 | 1 | 0 |
| 0 | 2 | 0 | 1 | 0 | 0 | 0 | 1 |
| 0 | 1 | 2 | 0 | 1 | 0 | 0 | 0 |
| 0 | 1 | 2 | 0 | 0 | 1 | 0 | 0 |
| 0 | 1 | 2 | 0 | 0 | 0 | 1 | 0 |
| 0 | 1 | 2 | 0 | 0 | 0 | 0 | 1 |
| 0 | 1 | 0 | 2 | 1 | 0 | 0 | 0 |
| 0 | 1 | 0 | 2 | 0 | 1 | 0 | 0 |
| 0 | 1 | 0 | 2 | 0 | 0 | 1 | 0 |
| 0 | 1 | 0 | 2 | 0 | 0 | 0 | 1 |
| 0 | 0 | 3 | 0 | 1 | 0 | 0 | 0 |
| 0 | 0 | 3 | 0 | 0 | 1 | 0 | 0 |
| 0 | 0 | 3 | 0 | 0 | 0 | 1 | 0 |
| 0 | 0 | 3 | 0 | 0 | 0 | 0 | 1 |
| 0 | 0 | 2 | 1 | 1 | 0 | 0 | 0 |
| 0 | 0 | 2 | 1 | 0 | 1 | 0 | 0 |
| 0 | 0 | 2 | 1 | 0 | 0 | 1 | 0 |
| 0 | 0 | 2 | 1 | 0 | 0 | 0 | 1 |
| 0 | 0 | 1 | 2 | 1 | 0 | 0 | 0 |
| 0 | 0 | 1 | 2 | 0 | 1 | 0 | 0 |
| 0 | 0 | 1 | 2 | 0 | 0 | 1 | 0 |
| 0 | 0 | 1 | 2 | 0 | 0 | 0 | 1 |
| 0 | 0 | 0 | 3 | 1 | 0 | 0 | 0 |
| 0 | 0 | 0 | 3 | 0 | 1 | 0 | 0 |
| 0 | 0 | 0 | 3 | 0 | 0 | 1 | 0 |
| 0 | 0 | 0 | 3 | 0 | 0 | 0 | 1 |

In general, a phthalocyanine-based coloring material has higher aggregation properties than coloring materials having other structures (for example, a triphenylmethane-based, an azo-based, or a xanthene-based). The enhancement of the aggregation property elevates the fastness of an image. Meanwhile, a coloring material having high aggregation properties show high aggregation properties of the coloring material in ink. Therefore, the occurrence of the bronze phenomenon that results in a reduction in image quality when a image was recorded on a recording medium to form a recorded matter. On the contrary, when the coloring material has significantly low aggregation properties, the fastness, especially environmental gas resistance of the coloring material reduces.

Accordingly, when the compound represented by general formula (I) or a salt thereof is used as a coloring material, the aggregation properties of the coloring material needs to be controlled so that the coloring material can provide high color developability, further the occurrence of the bronze phenomenon can be suppressed, and desired environmental gas resistance can be obtained.

Comparison between the compound represented by the general formula (I) or the salt thereof, which is a coloring material to be used in the ink of the present invention, and C.I. Direct Blue 199, C.I. Direct Blue 86, or the like, which is a representative coloring material having the same skeleton as that of the above coloring material and conventionally used for ink, shows the following. In the former coloring material, the molecular weight of a substituent that substitutes for a phthalocyanine skeleton is large, and the molecular weight of the entire coloring material is also large, so coloring efficiency per the same mass % reduces as compared to that of the latter coloring material. Therefore, the coloring material concentration in ink must be set to be high in order to obtain color developability comparable to that of ink containing a conventional coloring material. Particularly, when the ink is recorded on plain paper having low color developability to form a recorded matter, and is required to show the same color developability as those of an ink containing a conventional coloring material, the former ink preferably contains the coloring material in an amount (mass %) of 3.0 mass % or more with respect to the total mass of the ink. However, in order that the ink sufficiently satisfies reliability such as a property of preventing the ink from clogging at an ink eject opening in a recording head, the ink preferably contains 10.0 mass % or less of the coloring material.

The present inventors made an extensive investigate, while paying attention to the aggregation property of a compound represented by general formula (I) or a salt thereof, on the basis of the above described findings. As a result, the present inventors found that an ink using a compound represented by general formula (I) or a salt thereof as a coloring material shows high color developability. Furthermore, the present inventors found a method which can inhibit a bronze phenomenon from occurring by changing a type of a substituent to control the aggregation property of the coloring material, and increase environmental gas resistance; and accomplished the present invention.

(Measurement of Aggregation Property of Coloring Material: Maximum Absorption Wavelength)

One of methods for measuring the aggregation property of a coloring material to be used in the present invention will be now described below. A liquid for absorbance measurement is prepared by diluting ink into 2,000 times by mass with the use of 90 mass % of N,N-dimethylformamide aqueous solution, and absorbances at two maximum absorption wavelengths in a visible light range (380 nm or more and 780 nm or less) are determined from the measured spectrogram. Then, a ratio between thus obtained absorbances was found to most remarkably show the aggregation property of the coloring material contained in the ink.

When the absorbance is measured on the liquid with the use of a spectrophotometer, two maximum absorption wavelengths shown in a visible light range exist each in a range between 580 nm and 640 nm and in a range between 650 nm and 700 nm. It is generally said that a peak in a range between 580 nm and 640 nm originates in an associated state (aggregating) of a phthalocyanine-based coloring material and a peak in a range between 650 nm and 700 nm originates in a non-associated state (no-aggregating) of the phthalocyanine-based coloring material. In addition, it is known that these maximum absorption wavelengths vary with the number, types and substitution positions of substituents of the phthalocyanine-based coloring material. It is also known that when the phthalocyanine-based coloring material has a plurality of the substituents, the maximum absorption wavelengths vary with the ratio of the substituents.

States of the maximum absorption wavelengths greatly vary with an environment in which a coloring material exists, particularly, a medium in which the coloring material is dissolved. The fact will be now described below with reference to graphs. FIG. 14 is a graph showing an absorption spectrum for an aqueous solution of the phthalocyanine-based coloring material. In addition, FIG. 15 is a graph showing the absorption spectrum of a liquid containing the phthalocyanine-based coloring material dissolved in a solvent mainly formed of N,N-dimethylformamide.

As is shown in FIG. 14, when a phthalocyanine-based coloring material is dissolved in water, the spectrogram shows clear absorption in a range between 580 nm and 640 nm, which originates in an associated state, but does not clearly show maximum absorption in a range between 650 nm and 700 nm, which originates in a non-associated state. On the other hand, as is shown in FIG. 15, when the phthalocyanine-based coloring material is dissolved in a solvent mainly containing N,N-dimethylformamide, it was confirmed that the spectrogram showed clear absorptions each in a range between 580 nm and 640 nm and in a range between 650 nm and 700 nm.

Now, a value of absorbance in a maximum absorption wavelength (associated peak) in a range between 580 nm and 640 nm shall be defined as absorbance A, and a value of absorbance in a maximum absorption wavelength (non-associated peak) in a range between 650 nm and 700 nm shall be defined as absorbance B. It was found that when a value of B/A was thus determined, there was a correlation between the value B/A and the environmental gas resistance of a phthalocyanine-based coloring material (remaining density ratio in examples described later), as is shown in FIG. 16. The present inventors made an investigation on a phthalocyanine-based coloring material capable of combining environmental gas resistance with bronze resistance, based on a concept that the characteristics can be adequately prescribed by the value B/A on the basis of such findings, and accomplished the present invention.

In the present invention, absorbance A shall denote an absorbance of a maximum absorption wavelength in a range between 580 nm and 640 nm, and absorbance B shall denote an absorbance of a maximum absorption wavelength in a range between –650 nm and 700 nm. Then, when having a value B/A of 0.75 or more and 0.90 or less, which is a ratio of B to A, a phthalocyanine-based coloring material can acquire all of high levels of environmental gas resistance, capability for inhibiting a bronze phenomenon and color developability. Furthermore, it is particularly preferable that the value B/A is 0.75 or more and 0.85 or less. By the way, the value B/A according to the present invention is a value obtained by rounding off an original value to the third decimal place.

The conditions under which the absorbance is measured are as follows.

Spectrophotometer: Self-recording spectrophotometer (trade name: U-3300; manufactured by Hitachi, Ltd.)
Measurement cell: 1 cm quartz cell
Measurement range: 200 nm or more and 800 nm or less
Sampling interval: 0.5 nm
Scanning speed: 300 nm/mm
Number of measuring times: Measurement is performed once When measuring absorbance with a spectrophotometer, it is preferable to use a liquid in which ink is diluted into an aqueous solution containing 90 mass % N,N-dimethylformamide and the concentration of a coloring material is controlled to $1.5 \times 10^{-3}$ Mass %, more preferably $2.0 \times 10^{-3}$ mass %. In the present invention, when the above described absorbance A and the above described absorbance B are both 1 or less, the characteristics of a coloring material can be particularly preferably judged with accuracy.

(Measurement of Aggregation Property of Coloring Material: Small-Angle X-Ray Scattering Method)

The present inventors found another method of measuring such an aggregation property of a coloring material as to inhibit a bronze phenomenon from occurring and provide desired environmental gas resistance, when using a compound represented by general formula (I) or a salt thereof as the coloring material.

Specifically, a liquid is prepared which contains 3.0 mass % of a coloring material obtained by a small-angle X-ray scattering method, 50 mass % of N,N-dimethylformamide and 47.0 mass % of water. Then, it is preferable to use an ink in which a dispersion distance $d_{75}$ value corresponding to 75% of the distribution in a dispersion distance distribution of molecular aggregates in such a liquid is 5.60 nm or more and 6.10 nm or less.

Small-angle X-ray scattering method is applicable to another method of measurement of the aggregation property of a coloring material to be used in the present invention.

As described in, for example, "Saishin Colloid Kagaku" (Latest Colloid Chemistry) (Kodansha Scientific, Fumio Kitahara and Kunio Furusawa) and "Hyomen Jotai To Colloid Jotai" (Surface State and Colloid State) (Tokyo Kagaku Dozin, Co., Ltd., Masayuki Nakagaki), the small-angle X-ray scattering method is an approach that has been generally used for calculating a distance between colloid particles in a colloidal solution.

Figure 1:
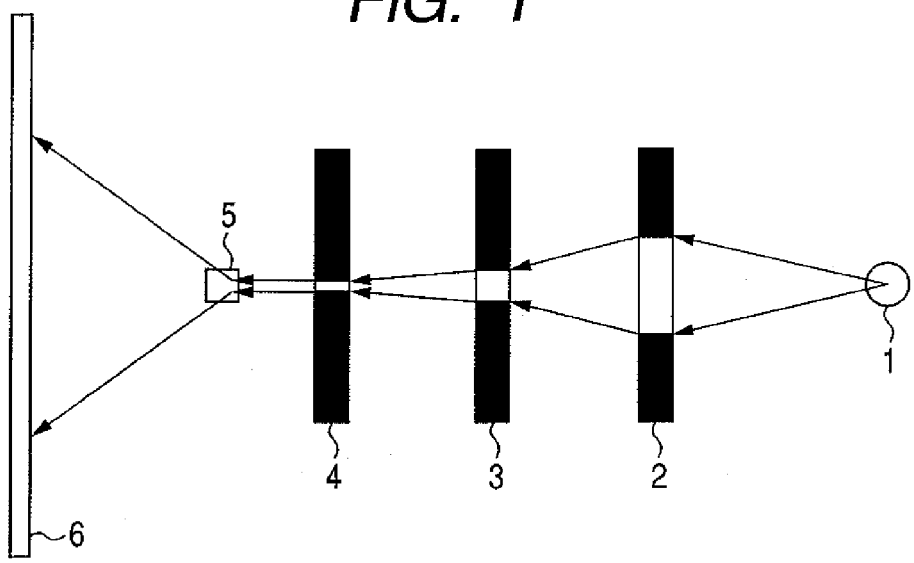
FIG. 1 is a view showing the measurement principle of a small-angle X-ray scattering method.

The outline of a small-angle X-ray scattering apparatus will be described with reference to FIG. 1 showing the measurement principle of the small-angle X-ray scattering method. A sample solution 5 is irradiated with an X-ray that has been generated from an X-ray source 1 and has passed through a first slit 2, a second slit 3 and a third slit 4, of which a focus size has been reduced to several millimeters or less while having passed the slits. The X-ray having irradiated the sample solution is scattered by particles in the sample solution and then is detected on an imaging plate 6. A value of a distance (d) between particles is determined based on Bragg equation (the following equation (1)) with the use of an obtained value θ, because the scattered X-rays cause interference due to a difference between those optical paths. In addition, the value (d) determined here is considered to be a distance between centers of the particles arranged at regular spacing.

$$d = \frac{\lambda}{2\sin\theta} \qquad \text{Equation (1)}$$

(In Equation (1), λ represents a wavelength of an X-ray; (d) represents a distance between particles; and θ represents a scattering angle).

Figure 2:
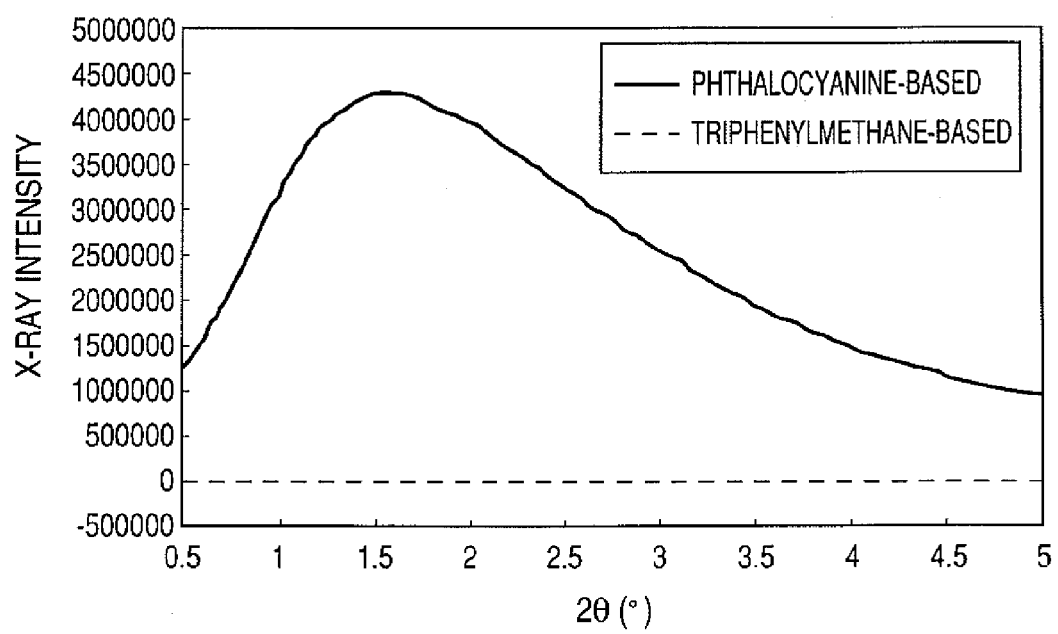
FIG. 2 is a small-angle X-ray scattering angle profile of each of a phthalocyanine-based coloring material and a triphenylmethane-based coloring material.

In general, no peak occurs in a scattering angle profile when particles in a solution are not regularly arranged. When an aqueous solution of a phthalocyanine-based coloring material to be used in the present invention is subjected to small-angle X-ray scattering, a strong peak having a maximum value in a range of 2θ=0° to 5° is detected in the scattering angle profile, and thus, it can be confirmed that the particles (molecular aggregates) formed by aggregation between phthalocyanine-based coloring material molecules are arranged at a certain rule. FIG. 2 shows scattering angle profiles for respective aqueous solutions containing 10 mass % of a triphenylmethane-based coloring material having a structure-represented by the following structural formula (1) and 10 mass % of a phthalocyanine-based coloring material having a structure represented by general formula (I). It is understood from FIG. 2 that the phthalocyanine based coloring material specifically has a scattering angle peak though the coloring materials show the same hue of cyan. In other words, when a phthalocyanine-based coloring material is dissolved in water, several phthalocyanine molecules agglomerate to form a molecular aggregate. At this time, the molecular aggregates are distributed at a certain distance as shown in a scattering angle profile.

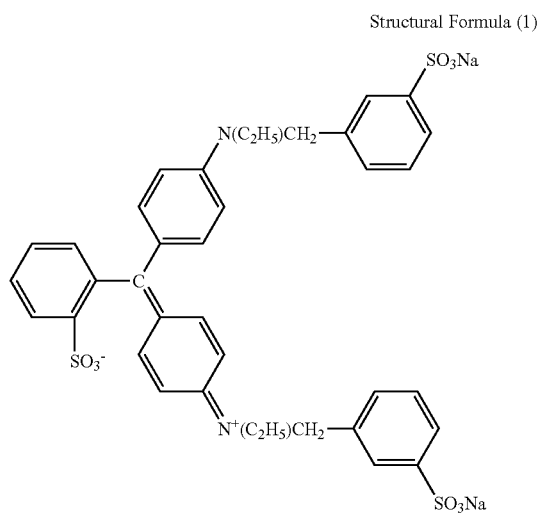

Structural Formula (1)

Figure 3:
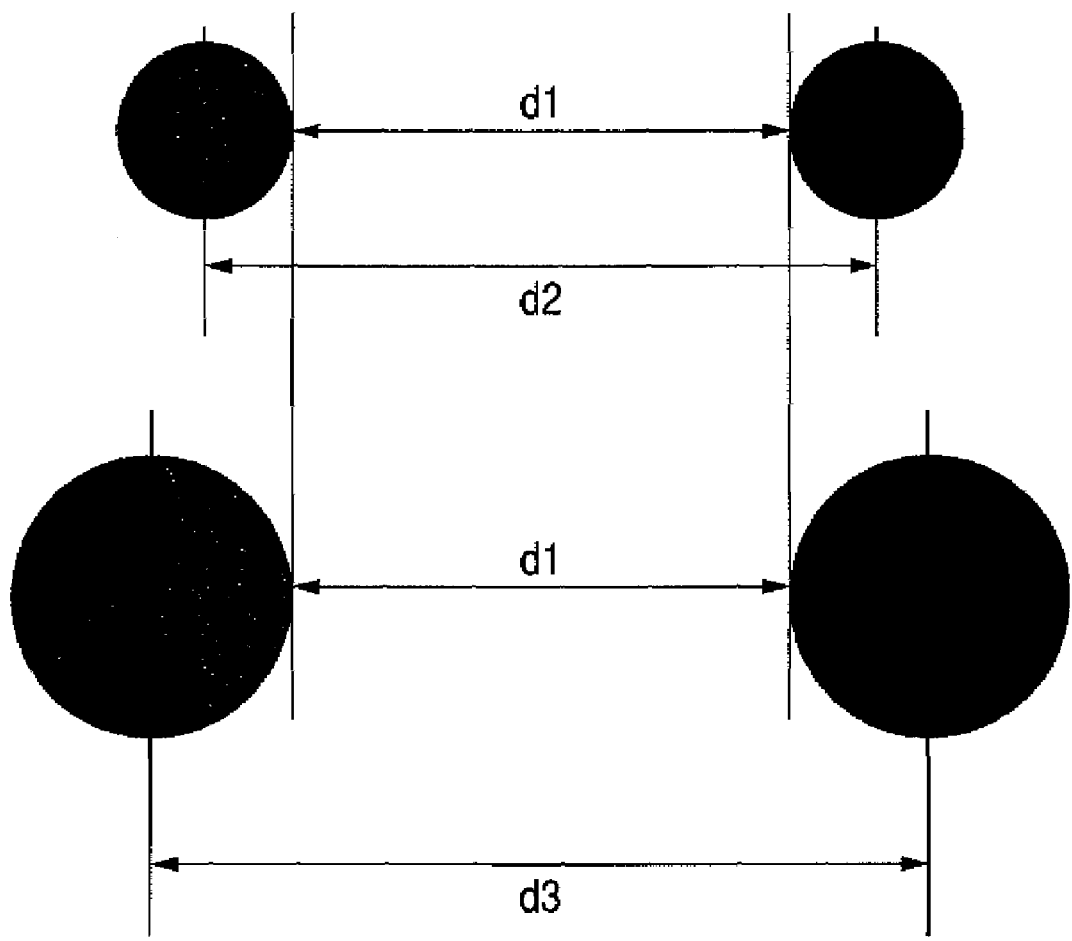
FIG. 3 is a conceptual diagram of the dispersion distance between molecular aggregates of a phthalocyanine-based coloring material.

FIG. 3 is a schematic view of a dispersion distance between molecular aggregates of a phthalocyanine-based coloring material. As is shown in FIG. 3, a radius of the molecular aggregate of the phthalocyanine-based coloring material shall be defined as (r1) and the distance between the molecular aggregates as (d1). When it is assumed that the phthalocyanine-based coloring material with the same structure always shows constant (d1), as the radius of the molecular aggregate formed of the phthalocyanine-based coloring material increases from r1 to r2, a value (d) measured by a small-angle X-ray scattering method is considered to increase from (d2) to (d3). Accordingly, the value (d) measured by the above described method is considered to be an index which shows a size of the molecular aggregate of the phthalocyanine-based coloring material, and the size of the molecular aggregate formed of the coloring material molecules is considered to increase with the increase of the value (d).

As a result of having examined a relationship between the value (d) in ink containing the phthalocyanine-based coloring material and a bronze phenomenon, a tendency was recognized that the larger is the value (d) of phthalocyanine-based coloring materials represented by the same structural formula, the more often tends to cause the bronze phenomenon. The fact proved that there is a relationship between the value (d) and a size of a molecular aggregate, when considering that the bronze phenomenon is caused by the aggregation of molecules of the coloring material on a recording medium.

The shape of a peak in a scattering angle profile shows a distribution of distances between molecular aggregates, namely, the distribution of the dispersion distances of the molecular aggregates. As was described above, when considering the fact that the dispersion distance is an index showing a size of the molecular aggregate, such a scattering angle profile is considered to show the distribution of the size of the molecular aggregate in a solution. In other words, supposing that a peak area in the scattering angle profile shows the size of the whole molecular aggregate in the solution, the larger is a value (d), namely, the higher is the existence frequency of the large molecular aggregate, the more often tends to cause the bronze phenomenon. Accordingly, it is considered to be possible to inhibit the occurrence of the bronze phenomenon by decreasing the existence frequency of the large molecular aggregate which tends to cause the bronze phenomenon. However, an ink containing only a remarkably small molecular aggregate hardly causes the bronze phenomenon, but degrades its environmental gas resistance. For this reason, it becomes necessary to precisely control the size of the molecular aggregate (level of value (d)), from the viewpoint of enabling a coloring material to inhibit the occurrence of the bronze phenomenon and imparting the coloring material the environmental gas resistance.

In general, when a size among molecular sizes of a coloring material appears at a specific frequency in a distribution, a critical threshold level which a human being can discriminate by visual observation is considered to be ¼ of the total frequencies. Now, a value (d) at which large molecular aggregates that tend to cause a bronze phenomenon occupy ¼ or less of the total molecular aggregates, in other words, at which small molecular aggregates that hardly causes the bronze phenomenon occupy ¾ or more of the total molecular aggregates shall be defined as a $d_{75}$ value. Then, it becomes possible to obtain an ink which inhibits the occurrence of the bronze phenomenon and has high environmental gas resistance, by controlling the $d_{75}$ value to a particular range.

It was examined how well a value $d_{peak}$ calculated from a peak in a value 2θ in a scattering angle profile and the above described $d_{75}$ value correlated to the occurrence level of a bronze phenomenon. As a result of this, it was found that the $d_{75}$ value which takes a distribution factor of sizes of all molecular aggregates into account shows higher correlation to the bronze phenomenon than the value ($d_{peak}$). By the way, a base line for determining a value 2θ was drawn in a range of 0.5° to 5°.

Then, the present inventors conducted an experiment with the use of a coloring material having changed the number, types and substitution positions of substituents in a compound or a salt thereof, which is a phthalocyanine-based coloring material represented by general formula (I), namely, with the use of a coloring material having controlled its aggregation property. A $d_{75}$ value was calculated after having prepared a liquid containing 3.0 mass % of the coloring material, 50.0 mass % of N,N-dimethylformamide and 47.0 mass % of pure water and obtained a scattering angle profile of the liquid. Subsequently, the aggregation property of each coloring material was evaluated on the bases of the $d_{75}$ value. As a result, it was found that an ink containing the coloring material having the above described $d_{75}$ value between 5.60 nm and 6.10 nm effectively inhibits the occurrence of a bronze phenomenon and shows high environmental gas resistance. It was further found that an ink containing the coloring material having the above described $d_{75}$ value between 5.65 nm and 5.90 nm particularly effectively inhibits the occurrence of a bronze phenomenon and shows high environmental gas resistance. In other words, a fact was found in the ink containing a compound represented by general formula (I) or a salt thereof, as would be described below. Specifically, it was found that when the aggregation property of the coloring material is controlled so that the $d_{75}$ value can be in the above described range, the ink can inhibit the bronze phenomenon from occurring and shows high environmental gas resistance even though the ink contains a high concentration of the coloring material so as to develop adequate color developability.

By the way, when measuring a value (d) with a small-angle X-ray scattering method, the density of molecules in a solution needs to be constant. Accordingly, it is preferable to measure the value (d) by using a solution prepared so as to contain a fixed concentration of a coloring material. In the present invention, a scattering angle profile was taken on a liquid which was prepared with the use of N,N-dimethylformamide and pure water so that a concentration (mass %) of a coloring material could be 3.0 mass % with respect to the total mass of the liquid.

(Maximum Absorption Wavelength in Absorption Spectrum)

The aggregation property of a coloring material measured with the above described two methods also correlates to the maximum absorption wavelength ($\lambda$max) in an absorption spectrum. There is a tendency that a coloring material having higher aggregation property (lower value B/A) in ink shows the maximum absorption wavelength in a shorter wavelength side. Accordingly, it is also possible to evaluate the aggregation property of the coloring material by using the maximum absorption wavelength which correlates with the value B/A. In the above method, it was found that when the ink which has been diluted to 2,000 times by mass with the use of water shows the maximum absorption wavelength in a range of 608.5 nm or more but less than 612.0 nm, the ink effectively inhibits the occurrence of a bronze phenomenon and shows high environmental gas resistance. (Practically, the maximum absorption wavelength has only to be 608.0 nm or more and less than 612.0 nm.) It was further found that when the diluted ink shows the maximum absorption wavelength in a range of 609.0 nm or more and less than 612.0 nm, the ink particularly effectively inhibits the occurrence of the bronze phenomenon and shows the high environmental gas resistance. In other words, it was found that the ink containing a compound represented by general formula (I) or a salt thereof, of which the aggregation property of the coloring material is controlled so that the maximum absorption wavelength of the ink can be in the above described range, inhibits the occurrence of the bronze phenomenon and shows the high environmental gas resistance, even though the ink contains a high concentration of the coloring material so as to show adequate color developability.

The conditions under which the maximum absorption wavelength is measured are as follows.

Spectrophotometer: Self-recording spectrophotometer (trade name: U-3300; manufactured by Hitachi, Ltd.)

Measurement cell: 1 cm quartz cell

Sampling interval: 0.1 nm

Scanning speed: 30 nm/min

The number of measurements: Measurement is performed five times to take the average value of the five measurements In addition, when measuring a maximum absorption wavelength, it is preferable to use a liquid in which an ink has been diluted with water so that the concentration of a coloring material of the ink can be $1.5 \times 10^{-3}$ mass %, more preferably $2.0 \times 10^{-3}$ mass %.

(Aqueous Medium)

The ink according to the present invention can use water or an aqueous medium which is a mixed solvent of water and any one of various water-soluble organic solvents. The water-soluble organic solvent is not limited in particular as long as it is water-soluble, and the water-soluble organic solvents described below can be used. These water-soluble organic solvents can be used singly or in combination with other water-soluble organic solvents. The content (mass %) of the water-soluble organic solvent in the ink is preferably 5.0 mass % or more and 90.0 mass % or less with respect to the total mass of the ink, and more preferably is 10.0 mass % or more and 50.0 mass % or less. When the ink containing less than 5.0 mass % of the water-soluble organic solvent is used as ink for an ink jet recording apparatus, the ink may aggravate its reliability such as ejectability. On the other hand, when the ink contains more than 90.0 mass % of the water-soluble organic solvent, the ink may not be able to be sufficiently supplied to the apparatus due to the increase of its viscosity.

Preferable water-soluble organic solvent includes: an alkyl alcohol having 1 to 4 carbon atoms, such as ethanol, isopropanol, n-butanol, isobutanol, secondary butanol and tertiary butanol; an carboxylic acid amid such as N,N-dimethylformamide and N,N-dimethylacetamide; a ketone or keto alcohol such as acetone, methyl ethyl ketone, 2-methyl-2-hydroxypentane-4-on; a cyclic ether such as tetrahydrofuran and dioxan; a polyhydric alcohol such as glycerin, ethylene glycol, diethylene glycol, triethylene glycol, tetraethylene glycol, 1,2- or 1,3-propylene glycol, 1,2- or 1,4-butylene glycol, and polyethylene glycol; a polyhydric alcohol also such as 1,3-butanediol, 1,5-pentanediols, 1,2-hexanediol and 1,6-hexanediol; a polyhydric alcohol further such as dithioglycol, 2-methyl-1,3-propanediol, 1,2,6-hexane triol, acetylene glycol derivative and trimethylolpropane; an alkyl-ether of a polyhydric alcohol such as ethylene glycol monomethyl (or ethyl)ether, diethylene glycol monomethyl (or ethyl)ether and triethylene glycol monoethyl (or butyl) ether; a heterocycle such as 2-pyrrolidone, N-methyl-2-pyrrolidone, 1,3-dimethyl-2-imidazolidinone and N-methylmorpholine; a sulfur-containing compound such as dimethyl sulfoxide; and urea and a urea derivative.

In the present invention, it is preferable to use an alkylether of a polyhydric alcohol such as 2-pyrrolidone, polyethylene glycol (with average molecular weight of 200 or more) and triethylene glycol monoethyl ether, among the above described water-soluble organic solvents. This is because an ink employing a compound represented by general formula (I) or a salt thereof in combination with the water-soluble organic solvents can develop an effect of inhibiting the occurrence of a bronze phenomenon. Particularly, 2-pyrrolidone is specifically preferable because of showing the effect of effectively inhibiting the occurrence of the bronze phenomenon, when used in combination with the compound represented by general formula (I) or the salt thereof.

A mechanism why those particular water-soluble organic solvents can inhibit the occurrence of a bronze phenomenon is not clear, but is assumed to be as described below. A $d_{75}$ value of ink measured with a small-angle X-ray scattering method does not vary according to the presence or absence of the particular water-soluble organic solvents in the ink. From the fact, the mechanism is considered to be that the particular water-soluble organic solvents do not change the aggregation property of a coloring material in the ink, but can inhibit aggregation between molecular aggregates of the coloring material on a recording medium. A content (mass %) of the particular water-soluble organic solvent in ink is preferably 50.0 mass % or more with respect to the content (mass %) of the coloring material, in order to make the ink containing the particular water-soluble organic solvents show the above described effect. Particularly, it is preferable for the ink to contain 2-pyrrolidone in an amount of 50.0 mass % or more with respect to the content (mass %) of the coloring material.

The ink also employs preferably deionized water (ion-exchange water) as water. The content (mass %) of water in ink is preferably 10.0 mass % or more and 90.0 mass % or less with respect to the total mass of the ink.

(Other Additives)

The ink according to the present invention may further contain various additives as needed such as a surfactant, a pH adjuster, a rust-preventive agent, an antiseptic agent, a fungicide, a chelating agent, a rust-preventive agent, ultraviolet absorbing agent, a viscosity adjuster, an antifoaming agent and a water-soluble polymer.

Specific examples of a surfactant include an anionic surfactant, an ampholytic surfactant, a cationic surfactant and a nonionic surfactant.

Specific examples of an anionic surfactant include the followings: alkyl sulfocarboxylate, α-olefin sulfonate, polyoxyethylene alkyl ether acetate, N-acylamino acid and a salt thereof; a salt of N-acylmethyltaurine, alkyl sulfate polyoxyalkyl ether sulfate and alkyl sulfate polyoxyethylene alkyl ether phosphate; rosin acid soap, castor oil sulfuric ester, lauryl alcohol sulfuric ester, alkyl phenol type phosphoric ester and alkyl type phosphoric ester; and alkyl allyl sulfonate, diethyl sulfosuccinate, diethyl hexyl sulfosuccinate and dioctyl sulfosuccinate.

Specific examples of a cationic surfactant include the followings: a 2-vinyl pyridine derivative and a poly 4-vinylpyridine derivative.

Specific examples of an ampholytic surfactant include the followings: lauryldimethylaminoacetate betaine, 2-alkyl-N-carboxymethyl-N-hydroxyethyl imidazolinium betaine, coconut oil fatty amide propyl dimethylaminoacetate betaine, polyoctyl polyaminoethyl glycin and an imidazoline derivative.

Specific examples of a nonionic surfactant include the followings: polyoxyethylene nonylphenyl ether, polyoxyethylene octylphenyl ether, polyoxyethylene dodecylphenyl ether and polyoxyethylene lauryl ether; an ether such as polyoxyethylene oleyl ether, polyoxyethylene alkyl ether and polyoxyaralkyl alkyl ether; polyoxyethylene oleic acid, polyoxyethylene oleate, polyoxyethylene distearate, sorbitan laurate and sorbitan monostearate; an ester such as sorbitan monooleate, sorbitan sesquioleate, polyoxyethylene monooleate and polyoxyethylene stearate; an acetylene glycol such as 2,4,7,9-tetramethyl-5-decyne-4,7-diol, 3,6-dimethyl-4-octyne-3,6-diol and 3,5-dimethyl-1-hexyne-3-ol; and, for instance, Acetylenol EH made by Kawaken Fine Chemicals Co., Ltd., Surfynol 104, 82 and 465 and Olfin STG made by Nissin Chemical Industry Co., Ltd.

A pH adjuster can preferably control the pH of ink into a range of 6.0 to 11.0. Specifically, the adjuster includes the following: an alcohol amine compound such as diethanolamine, triethanolamine, isopropanolamine and tris-hydroxymethyl amino methane; a hydroxide of an alkali metal such as lithium hydroxide and potassium hydroxide; ammonium hydroxide; and a carbonate of an alkali metal such as lithium carbonate, sodium carbonate and potassium carbonate. Among those, the alcoholamine compound and the carbonate of the alkali metal are preferably used because of having an effect of inhibiting the occurrence of a bronze phenomenon. Specific examples of the alcoholamine compound include diethanolamine, triethanolamine, isopropanolamine and tris-hydroxymethyl amino methane. In addition, the specific examples of the carbonate of the alkali metal include lithium carbonate, sodium carbonate and potassium carbonate.

Specific examples of an antiseptic agent and a fungicide include the followings: an organosulfide type, an organonitrosulfide type, an organohalogen type, a haloallyl sulfonate type, an iodine propargyl type, an N-haloalkylthio type, a benzthiazole type, a nitrile type, a pyridine type, an 8-oxyquinoline type, a benzothiazol type, an isothiazoline type and a dithiol type; and a pyridine oxide type, a nitropropane type, an organotin type, a phenolic type, a quaternary ammonium salt, a triazine type, a thiadiazine type, an anilide type, an adamantane type, a dithiocarbamate type, a brominated indanone type, a benzyl bromoacetate type and an inorganic salt.

Organohalogen compounds include, for instance, the followings: sodium pentachlorophenol; a pyridine oxide compound such as 2-pyridinethiol-1 sodium oxide; and an inorganic salt compound such as anhydrous sodium acetate.

An isothiazoline compound includes, for instance, the followings: 1,2-benzisothiazolin-3-on, 2-n-octyl-4-isothiazoline-3-on, 5-chloro-2-methyl-4-isothiazoline-3-on, 5-chloro-2-methyl-4-isothiazoline-3-on magnesium chloride and 5-chloro-2-methyl-4-isothiazoline-3-on calcium chloride.

Specific examples of other antiseptic agent and fungicide include the followings: sodium sorbate sodium benzoate such as Proxel GXL (S) and Proxel XL-2 (S) made by Avecia.

A chelating agent includes, for instance, the followings: sodium citrate, sodium ethylenediaminetetraacetate, sodium dinitrotriacetate, sodium hydroxyethyl ethylenediaminetriacetate, sodium diethylenetriaminepentaacetate and sodium uramildiacetate.

A rust-preventive agent includes, for instance, the followings: bisulphite, sodium thiosulfate, ammonium thioglycollate, diisopropyl ammonium nitrite, pentaerythritol tetranitrate and dicyclohexyl ammonium nitrite.

An ultraviolet absorbing agent includes, for instance, the followings: a benzophenone compound, a benzotriazole compound, a cinnamic acid compound, a triazine compound and a stilbene compound. In addition, a compound so-called a fluorescent brightener can be used which is represented by a benzoxazole compound, and shows fluorescence by absorbing ultra-violet rays.

A viscosity adjuster includes a water-soluble polymer compound in addition to a water-soluble organic solvent. The usable water-soluble polymer compound includes, for instance, polyvinyl alcohol, a cellulose derivatives polyamine and polyimine.

A usable antifoamer includes a fluorine compound and a silicone compound.

(Recording Medium)

Any recording medium can be used for forming an image by means of the ink of the present invention as long as recording is performed by applying the ink to the recording medium. The present invention is applicable to a recording medium in which a coloring material such as a pigment is adsorbed to a fine particle forming a porous structure in an ink-receiving layer and an image is formed from at least the fine particle having adsorbed thereto the coloring material, and the present invention is particularly suitable for the case where an ink jet method is used. Such ink jet recording medium is preferably of a so-called absorption type in which ink is absorbed by a gap formed in an ink-receiving layer on a support.

An absorption type ink-receiving layer is constituted as a porous layer mainly composed of a fine particle and containing a binder and any other additive as required. These components can be used singly or in combination with other components.

Specific examples of fine particles include the followings: silica, clay, talc, calcium carbonate and kaolin; aluminum oxide such as alumina and hydrated alumina; an inorganic pigment such as diatomite, titanium oxide, hydrotalcite and zinc oxide; and an organic pigment such as a urea formalin resin, an ethylene resin and a styrene resin.

A usable binder includes a water-soluble polymer and latex, and specific examples include the followings: polyvinyl alcohol or a denatured compound thereof, starch or a denatured compound thereof, gelatin or a denatured compound thereof, and gum Arabic; a cellulose derivative such as carboxymethyl cellulose, hydroxyethyl cellulose and hydroxypropyl methyl cellulose; vinyl copolymer latex such as SBR latex, NBR latex, methyl methacrylate-butadiene copolymer latex, functional group denatured polymer latex and ethylene-vinyl acetate copolymer; and polyvinylpyrrolidone, maleic anhydride or a copolymer thereof and an acrylate copolymer.

Additives can be used as needed and specific examples include the followings: a dispersing agent, a thickener, a pH adjuster, a lubricant, a fluidity denaturant, a surfactant, an antifoaming agent, a mold lubricant, a fluorescent brightener, an ultraviolet absorbing agent and an antioxidant.

In particular, a recording medium having formed thereon an ink-receiving layer mainly composed of fine particles having an average particle size of 1 μm or less is preferably used in the present invention. Specific examples of the fine particles include silica fine particles and aluminum oxide fine particles. Preferable silica fine particles are silica fine particles typified by colloidal silica. Colloidal silica, which itself is available from the market, is particularly preferably that described in Japanese Patent No. 2803134 or Japanese Patent No. 2881847. Preferable aluminum oxide fine particles are alumina hydrate fine particles and the like. An alumina hydrate represented by the following general formula can be exemplified as one example of such alumina hydrate fine particles.

$$Al_2O_{3-n}(OH)_{2n} \cdot mH_2O$$

(In the formula, n represents an integer of 1, 2, or 3, and m represents a value of 0 to 10, or preferably 0 to 5; provided, however, that m and n are not simultaneously 0. m may be or may not be an integer because $mH_2O$ also represents an aqueous phase that can desorb and is not involved in the formation of an $mH_2O$ crystal lattice in many cases. In addition, heating such kind of material may cause m to reach 0.)

An alumina hydrate can be produced by means of a conventionally known method such as: the hydrolysis of aluminum alkoxide or sodium aluminate described in U.S. Pat. No. 4,242,271 or U.S. Pat. No. 4,202,870; or a method involving adding an aqueous solution of sodium sulfate, aluminum chloride, or the like to an aqueous solution of sodium aluminate or the like to perform neutralization described in Japanese Publication No. H57-44605.

The recording medium preferably has a support for supporting the above-described ink-receiving layer. Any support can be use without any particular limitation as long as its ink-receiving layer can be formed of the above-described porous fine particles and the support provides rigidity such that the support can be conveyed by a conveying mechanism of an ink jet recording apparatus. Specific examples thereof include: a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer added with a white pigment or the like.

(Ink Jet Recording Method)

The ink according to the present invention is preferably used for an ink jet recording method including the step of ejecting the ink by means of an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

(Ink Cartridge)

When making a recorded matter with the use of the ink according to the present invention, an ink cartridge provided with an ink storage portion for storing the ink can be used. In the next place, a specific example of the ink cartridge will be described.

FIG. 10 is a schematic explanatory view of a liquid storage container which is an ink cartridge. In FIG. 10, the liquid storage container has a structure in which a chamber 134 for storing a negative-pressure-generating member therein and a liquid storage chamber 136 are partitioned by a partition wall 138. The chamber 134 for storing a negative-pressure-generating member therein communicates with atmospheric air at an upper part through an atmospheric air communication opening 112, communicates with an ink supply port at a lower part, and accommodates a negative-pressure-generating member therein. The liquid storage chamber, 136 stores a liquid ink and is substantially sealed. The chamber 134 for storing a negative-pressure-generating member therein communicates with the liquid storage chamber 136 only through a communicating hole 140 formed in the partition wall 138 in the vicinity of the bottom of the liquid storage container and an atmosphere introduction groove (atmosphere introduction path) 150 for promoting introduction of the atmospheric air into the liquid storage chamber while the liquid is supplied. A plurality of ribs are integrally formed on an upper wall of the liquid storage container which forms the chamber 134 for storing a negative-pressure-generating member, in a form of protruding toward the inner part, and abut with the negative-pressure-generating member stored in a compressed state by the chamber 134 for storing a negative-pressure-generating member. The ribs form an air buffer chamber between the upper wall and the top surface of the negative-pressure-generating member. In addition, a pressure-welded body 146 having a higher capillary force than that the negative-pressure-generating member and high physical strength is installed in an ink supply pipe provided with a liquid supply port 114, and is pressure-welded with the negative-pressure-generating member.

The chamber 134 for storing a negative-pressure-generating member therein stores two negative-pressure-generating members of a capillary-force-generating type as the negative-pressure-generating member, which are a first negative-pressure-generating member 132B and a second negative-pressure-generating member 132A that are formed of fibers of an olefinic resin such as polyethylene. Reference character 132C denotes a boundary layer between those two negative-pressure-generating members, and intersects with a partition wall 138 at a position above an upper end of an atmosphere introduction groove (atmospheric air introduction path) 150, when viewed from an attitude of using a liquid storage container directing a communication part downward. Ink stored by the negative-pressure-generating member exists up to a position above the above described boundary layer 132C, as is shown in a liquid level L of the ink. Here, the first negative-pressure-generating member 132B is pressure-welded with the second negative-pressure-generating member 132A at the boundary layer between them, and a neighborhood of the boundary layer of the negative-pressure-generating member is more strongly compressed than other parts has a high capillary force. Namely, when P1 is defined as the capillary force of the first negative-pressure-generating member 132B, P2 is defined as the capillary force of the second negative-pressure-generating member 132A, and PS is defined as the capillary force of an interface between the negative-pressure-generating members, each capillary force satisfies the relation of P2<P1<PS.

FIG. 11 is a schematic explanatory view of a liquid storage container which is another ink cartridge. The liquid storage container having a form shown in FIG. 11 has a container 41 for storing three colored inks of yellow (Y), magenta (M) and cyan (C), and a lid member 42 for covering the container 41. The inner part of the container 41 is partitioned into three spaces each having an approximately equal volume, by two partition plates 411 and 412 arranged in parallel to each other, in order to store the three colored inks. These three spaces are aligned along an insertion direction of an ink cartridge when the ink cartridge is separately inserted into an ink cartridge holder. These respective spaces store an ink-absorbing body 44Y for absorbing and holding a yellow ink, an ink-absorbing body 44M for absorbing and holding a magenta ink and an ink-absorbing body 44C for absorbing and holding a cyan ink. The inks stored by the ink-absorbing bodies 44Y, 44M and 44C, which are negative-pressure-generating members, exist so as to reach the upper part of the respective ink-absorbing bodies as represented by a liquid level L of the ink.

When making a recorded matter with the use of ink according to the present invention, an ink cartridge integrated with a recording head can be also used. In addition, an ink cartridge to be preferably used in the present invention has such respective liquid rooms of composing an ink set as to evaporate substantially the same volume of respective inks from the respective liquid rooms. Evaporating substantially the same volume of respective inks from the respective liquid rooms of composing the ink set means that when water is charging in the respective liquid rooms and an evaporation rate from the respective liquid rooms is measured, for instance, the difference among the evaporation rates is about 1% or less.

FIG. 12 is an exploded view of a recording head which can be used in the present invention. The recording head shown in FIG. 12 is integrated with an ink cartridge. The recording head 1001 is supported and fixed by positioning means and an electrical contact of a carriage mounted on an ink jet recording apparatus, can be detached from and attached to the carriage, and is changed when carried ink is used up.

A recording head 1001 is directed at ejecting ink, and is composed of a recording element substrate 1100, an electric wiring tape 1300, an ink feed hold member 1400, an ink-absorbing body 1500 and a lid member 1600. The recording element substrate 1100 has ink supply ports formed in parallel. The electric wiring tape 1300 forms an electrical signal path for applying an electrical signal to eject ink. The ink feed hold member 1400 is formed of a mold of a resin. The ink-absorbing body 1500 generates a negative pressure for holding the ink.

An ink feed hold member 1400 has a function of an ink cartridge and a function of feeding ink. The ink feed hold member 1400 has a space for holding an absorbing body 1500 which generates a negative pressure for holding the inks of cyan, magenta and yellow therein, and has independent ink channels for introducing the inks to ink supply ports of the recording element substrate 1100. The ink supply port 1200 for supplying the ink to the recording element substrate 1100 is formed in a downstream of the ink channel. The recording element substrate 1100 is fixed to the ink feed hold member 1400 so that the ink supply port of the recording element substrate 1100 can communicate with the ink supply port 1200 of the ink feed hold member 1400. In addition, a back face of one part of an electrical wiring tape 1300 is fixed on a plain face around the vicinity of the ink supply port 1200. A lid member 1600 closes the space in the ink feed hold member 1400 by being welded to the upper opening of the ink feed hold member 1400. The lid member 1600 has an engaging part 1700 for fixing a recording head to an ink jet recording apparatus.

FIG. 13 is an exploded view of another example of a recording head usable in the present invention. The recording head in FIG. 13 is integrated with an ink cartridge as in the case of FIG. 12. The recording head 1001 can carry a plurality of different color inks (such as cyan ink, magenta ink and yellow ink) thereon, and is changed when the carried ink is used up.

A recording head 1001 is directed at ejecting a plurality of different color inks (for instance, cyan ink, magenta ink and yellow ink); and is composed of a recording element substrate 1100 and the like, which has ink supply ports for cyan, magenta and yellow inks formed in parallel. The ink feed hold member 1400 has a function of an ink cartridge and a function of feeding ink. The ink feed hold member 1400 has a space for independently accommodating each of absorbing bodies 1501, 1502 and 1503 which generate a negative pressure for holding the inks of cyan, magenta and yellow therein. The ink feed hold member 1400 has also independent ink channels for introducing each ink to an ink supply port of the recording element substrate 1100.

(Recording Unit)

An example of a recording unit suitable for performing recording by means of the ink according to the present invention includes a recording unit including: an ink storage portion for storing the ink and a recording head. In particular, a recording unit in which the recording head applies thermal energy corresponding to a recording signal to the ink to generate an ink droplet by virtue of the energy can be exemplified.

(Ink Jet Recording Apparatus)

An example of a recording apparatus suitable for performing recording by means of the ink according to the present invention includes a recording apparatus in which thermal energy corresponding to a recording signal is applied to ink in the chamber of a recording head having an ink storage portion for storing the ink to generate an ink droplet by virtue of the energy.

Hereinafter, the schematic constitution of a mechanism portion of an ink jet recording apparatus will be described. A recording apparatus main body is constituted by a sheet feeding portion, a sheet conveying portion, a carriage portion, a sheet discharge portion, and a cleaning portion, and an external packaging portion for protecting them and providing them with design to achieve a role of each mechanism. Hereinafter, the outline of each of them will be described.

Figure 4:
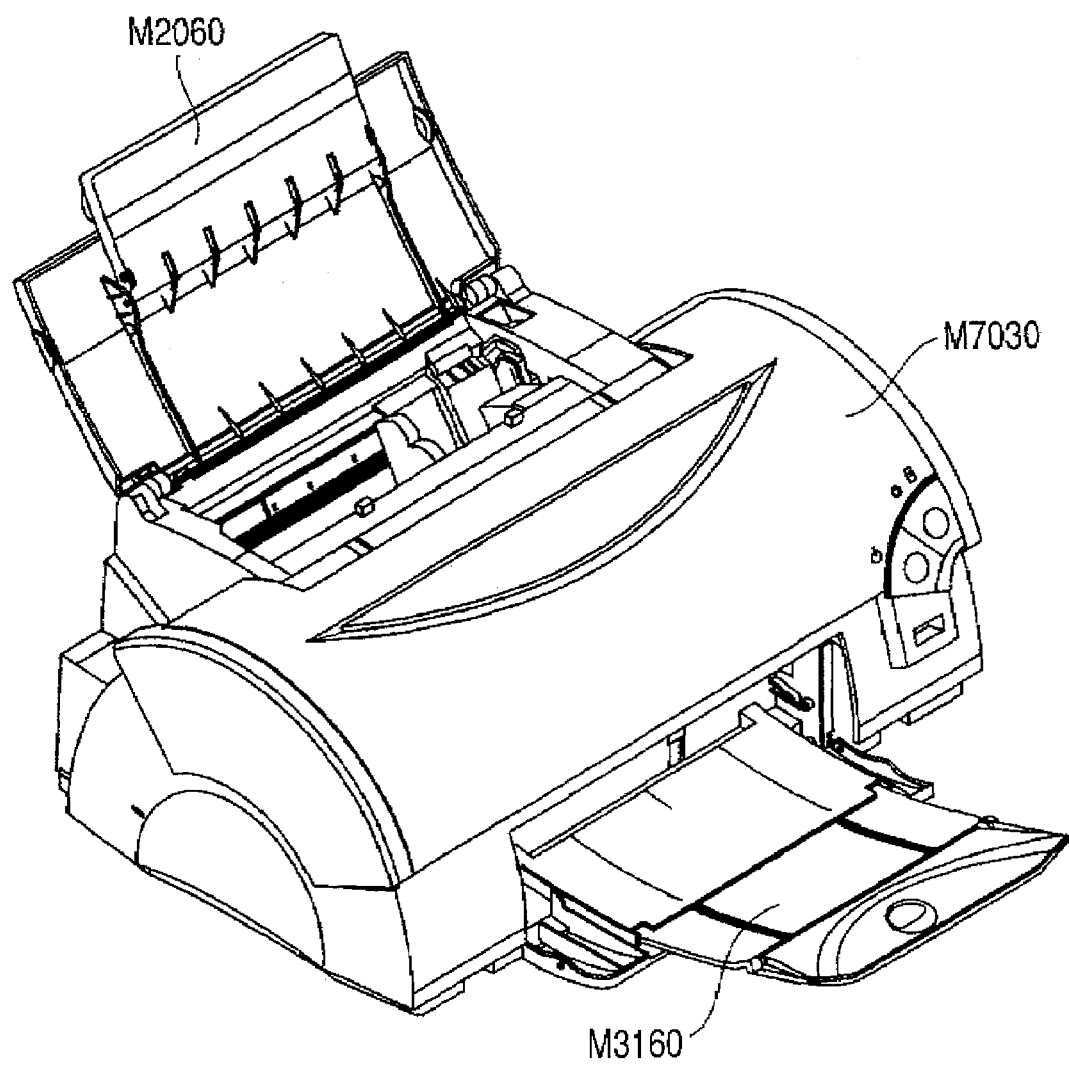
FIG. 4 is a perspective view of an ink jet recording apparatus.
Figure 5:
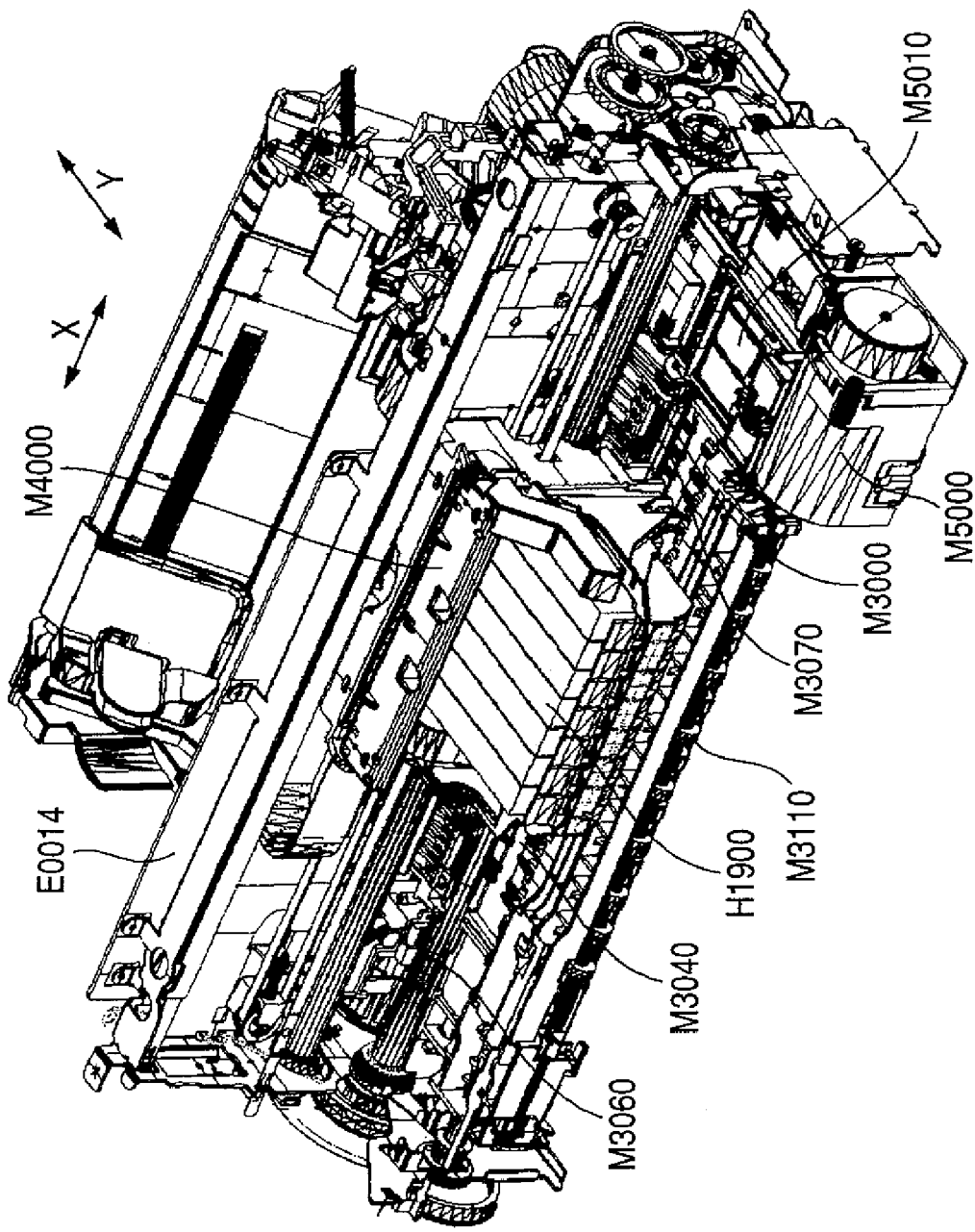
FIG. 5 is a perspective view of a mechanism section of an ink jet recording apparatus.
Figure 6:
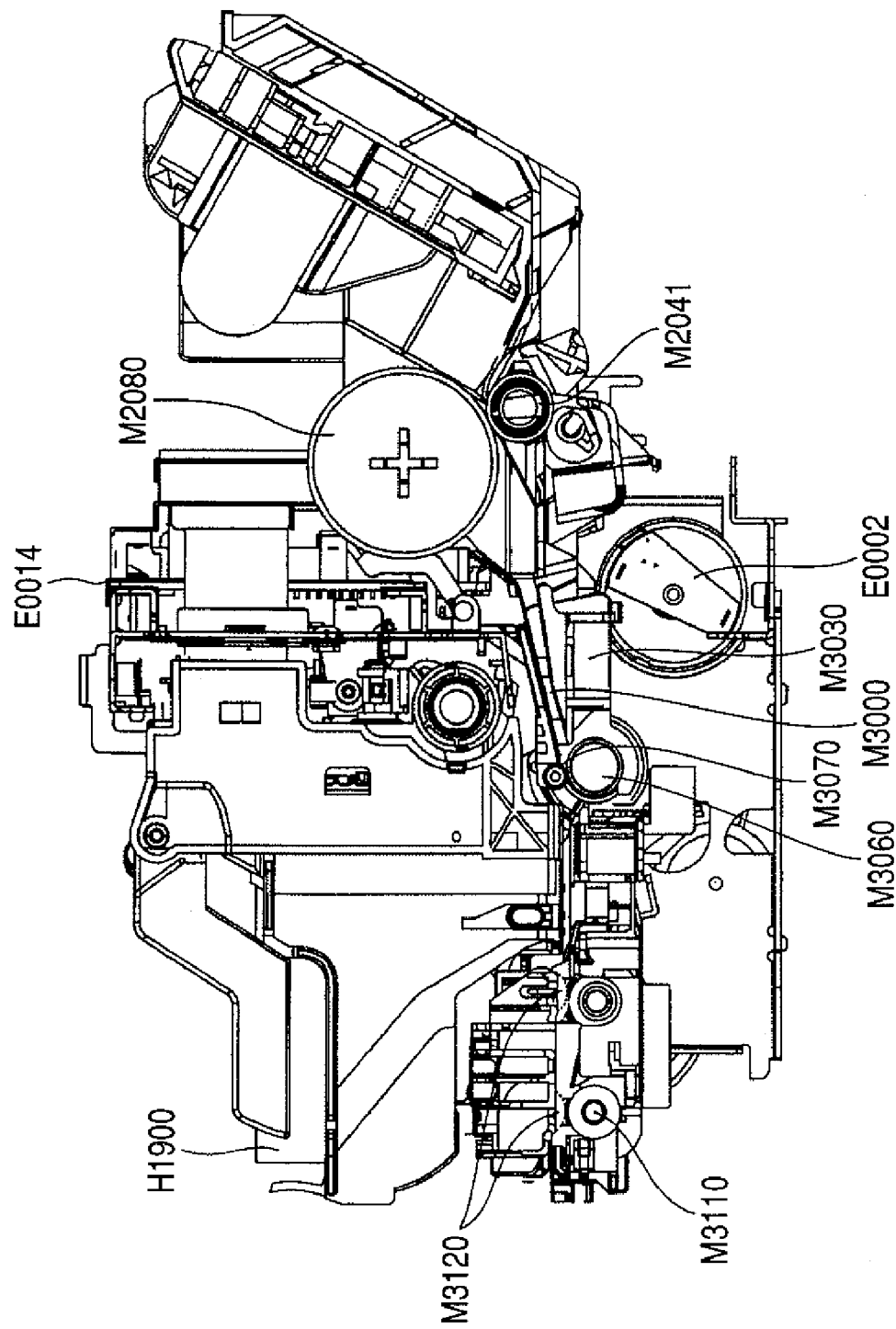
FIG. 6 is a sectional view of an ink jet recording apparatus.

FIG. 4 is a perspective view of a recording apparatus. FIGS. 5 and 6 are views for explaining the internal mechanism of a recording apparatus main body. FIG. 5 is a perspective view seen from an upper right portion, and FIG. 6 is a side sectional view of the recording apparatus main body.

When a sheet is to be fed in the recording apparatus, only a predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by the driving of an LF motor E0002, and the rotation causes the recording medium to be conveyed on a platen M3040.

In the carriage portion, when an image is to be formed on a recording medium, a recording head H1001 (FIG. 7) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in a column direction and sub scanning in which a recording medium is conveyed in a row direction by the conveying roller M3060 are alternately repeated, whereby an image is formed on the recording medium.

Finally, the recording medium on which an image has been formed is sandwiched at a nip between a first sheet discharge roller M3110 and a spur M3120 in the sheet discharge portion, conveyed, and discharged to a sheet discharge tray M3160.

In the cleaning portion, when a pump M5000 is allowed to act in a state where a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Recording Head)

The constitution of a head cartridge H1000 will be described. The head cartridge H1000 includes the recording head H1001, means for mounting ink tanks H1900, and means for supplying ink from the ink tanks H1900 to the recording head, and is detachably mounted on the carriage M4000.

Figure 7:
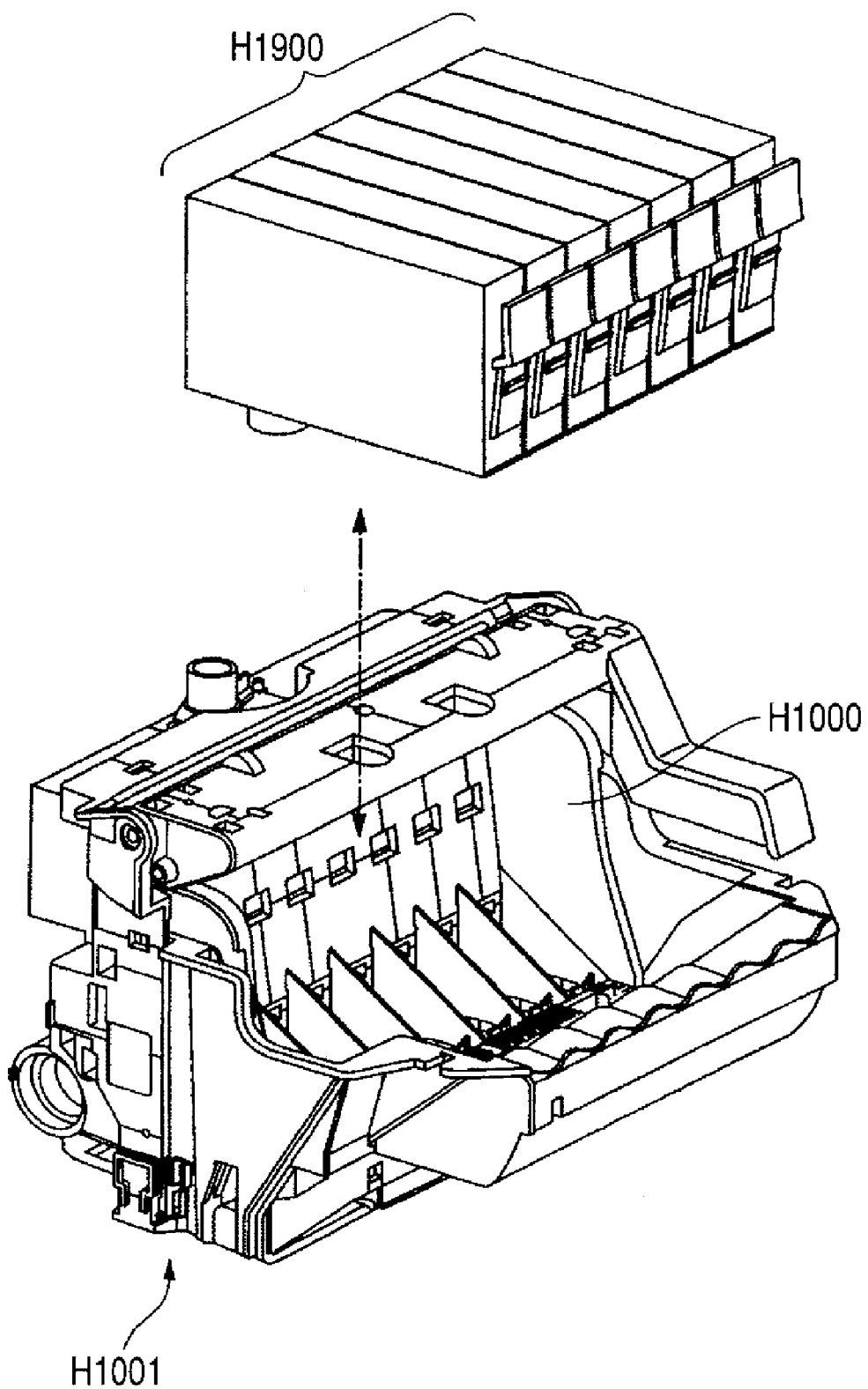
FIG. 7 is a perspective view showing a state in which an ink cartridge to be attached to a head cartridge.

FIG. 7 shows how the ink tanks H1900 are mounted on the head cartridge H1000. The recording apparatus forms an image by means of yellow, magenta, cyan, black, light magenta, light cyan, and green inks, so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in a state where the head cartridge H1000 is mounted on the carriage M4000.

FIG. 8 is an exploded perspective view of a head cartridge H1000. The head cartridge H1000 is composed of a recording element substrate, a plate, an electric wiring substrate H1300, a tank holder H1500, a channel-forming member H1600, a filter H1700 and a seal rubber H1800. The recording element substrate is composed of a first recording element substrate H1100 and a second recording element substrate H1101. The plate is composed of a first plate H1200 and a second plate H1400. The first recording element substrate H1100 and the second recording element substrate H1101 are Si substrates, and have a plurality of recording elements (nozzles) for ejecting ink on one surface thereof formed with a photolithographic technology. Electric wires such as Al for supplying an electric power to each recording element are formed with a film-forming technology. A plurality of ink channels corresponding to each recording element are also formed with the photolithographic technology. Furthermore, an ink supply port for supplying the ink into a plurality of ink channels are formed so as to open toward the back surface.

FIG. 9 is an enlarged front view for explaining the constitution of each of the first recording element substrate H1100 and the second recording element substrate H1101. Reference symbols H2000 to H2600 denote recording element trains (which may hereinafter be also referred to as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which light cyan ink is supplied, the nozzle train H2400 to which black ink is supplied, the nozzle train H2500 to which orange ink is supplied, and the nozzle train H2600 to which light magenta ink is supplied.

Each nozzle train is constituted by 768 nozzles arranged at an interval of 1,200 dpi (dot/inch; reference value) in the conveying direction of a recording medium, and each nozzle ejects about 2 pl of ink. An opening area in each eject opening is set at about 100 $\mu m^2$. A first recording element substrate H1100 and a second recording element substrate H1101 are adhesively bonded to a first plate H1200. The first plate H1200 has an ink supply port H1201 for supplying ink to the first recording element substrate H1100 and the second recording element substrate H1101 formed therein. The first plate H1200 has further a second plate H1400 having the opening adhesively bonded thereon. The second plate H1400 holds an electric wiring substrate H1300 so that the electric wiring substrate H1300 can be electrically connected with the first recording element substrate H1100 and the second recording element substrate H1101.

The electric wiring substrate H1300 applies an electrical signal for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the recording apparatus main body. The external signal input terminal H1301 is positioned and fixed to the back surface side of the tank holder H1500.

Meanwhile, the flow path forming member H1600 is fixed by means of, for example, ultrasonic welding to the tank holder H1500 for holding the ink tanks H1900. Thus, an ink-flow path H1501 passing from the ink tanks H1900 to the first plate H1200 is formed. The filter H1700 is arranged at an end portion on the ink tank side of the ink flow path H1501 engaged with the ink tanks H1900, so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is constituted by connecting through bonding or the like a tank holder portion constituted by the tank holder H1500, the flow path forming member H1600, the filter H1700, and the seal rubber H1800, and the recording head portion H1001 constituted by the first recording element substrate H1100, the second recording element substrate H1101, the first plate H1200, the electric wiring substrate H1300, and the second plate H1400.

By the way, a thermal ink jet type recording head was described as one form of recording heads in the above description, which makes a record by using an electrothermal conversion body (recording element) that generates thermal energy for causing film boiling in ink according to an electrical signal. The thermal ink jet type recording head preferably employs a basic principle of which the representative configuration and principle is disclosed, for instance, in U.S. Pat. Nos. 4,723,129 and 4,740,796. The thermal ink jet type can be applied to both of a so-called on-demand type and a continuous type. The thermal ink jet type is particularly effective when applied to the on-demand type. The on-demand type ink jet recording head applies at least one driving signal for causing such a rapid temperature rise as to exceed nuclear boiling in ink according to recording information, to an electrothermal conversion body arranged so as to correspond to a liquid channel for holding ink. Thereby, the ink jet recording head generates thermal energy in the electrothermal conversion body, causes film boiling on a heat-generating surface of a recording head and can consequently form such bubbles in ink as to correspond to the driving signal in one-to-one relationship. The ink jet recording head forms at least one drop by ejecting the ink through a eject opening by using the growth and shrinkage of the bubble. It is further preferable to make the driving signal into a pulse shape, because the bubble is immediately adequately grown and shrinked, and the ink is thereby ejected so as to particularly excellently respond to the driving signal.

Another form of an ink jet recording apparatus includes that of using dynamic energy. The ink jet recording apparatus has a nozzle-formed substrate provided with a plurality of nozzles, a pressure-generating element consisting of a piezoelectric material arranged so as to face the nozzle and a conductive material, and the ink which fills a space around the pressure-generating element; and displaces the pressure-generating element by applied voltage, and ejects the ink from a eject opening.

An ink jet recording apparatus is not limited to a apparatus having a recording head and an ink cartridge separated, as described above, but it is also acceptable to use a apparatus having those undetachably integrated. Furthermore, it is acceptable to use an ink jet recording apparatus having the ink cartridge which is detachably or undetachably integrated with the recording head and is carried on a carriage, or an ink jet recording apparatus having the ink cartridge which is placed in a fixed part of the ink jet recording apparatus and supplies ink to the recording head through an ink-feeding member such as a tube. Furthermore, when preparing such a configuration as to exert preferred negative pressure on the recording head, in the ink cartridge, the ink cartridge can employ the following configuration. Specifically, the ink cartridge can employ a form of placing an absorbing body in an ink-storing section of the ink cartridge, or a form of having a flexible ink storage sack and a butt for exerting an accompanying force in a direction of expanding the internal volume onto the sack. The ink jet recording apparatus may adopt the above described serial type recording system, and may also adopt the form of a line printer having recording elements arranged in a range corresponding to a full width of a recording medium.

EXAMPLES

Hereinafter, the present invention will be described in more detail by way of examples and comparative examples. However, the present invention is not limited to the following examples unless the examples depart from the gist of the present invention. Unless otherwise stated, the term "part" of each ink component in examples and comparative examples represents "part by weight".

<Synthesis of Coloring Material>

Coloring materials A to G were synthesized on the basis of a synthesis method according to Japanese Patent Application Laid-Open No. 2004-323605. Specifically, the coloring materials were prepared by the steps of: chlorosulfonating a phthalocyanine pigment by using chlorosulfonic acid and thionyl chloride; introducing a sulfonic group ($-SO_3M$) into a phthalocyanine skeleton by hydrolyzing the above described chlorosulfonic group; in addition, introducing an unsubstituted sulfamoyl group ($-SO_2NH_2$) into the phthalocyanine skeleton by reacting the above described chlorosulfonic group with an ammonium salt or the like; and further introducing a substituted sulfamoyl group (group represented by general formula (III) described above) into the phthalocyanine skeleton, by reacting the above described chlorosulfonic group with a compound represented by the following structural formula (2) (though the synthesis method will be described later).

After synthesis conditions such as an amount of the raw materials to be prepared, reaction concentration and a reaction temperature had been examined in detail, ratios of a sulfonic group, an unsubstituted sulfamoyl group and a substituted sulfamoyl group to be introduced into a phthalocyanine skeleton were adjusted. For example, the ratio of a peak A originating in an associated (aggregation) state of a phthalocyanine-based coloring material increases, in other words, a value B/A decreases, by increasing the ratio of the above described unsubstituted sulfamoyl group ($-SO_2NH_2$) introduced into the phthalocyanine skeleton. By making use of the fact, the value B/A can be optionally set. Thus, the coloring materials A to G were synthesized which are compounds represented by general formula (I) or salts thereof each having a different average number of substituents and substituted positions, and having a group represented by general formula (III) wherein Y is an amino group; and $R_1$ and $R_2$ are sulfonic groups substituted in 2-position and 5-position (illustrated substituent 1). For information, it is known that when substituents are introduced into a phthalocyanine pigment according to the above described steps, the copper phthalocyanine surely possesses a substituent at least at its 3-position and 3'-position in at least one benzene ring in the copper phthalocyanine skeleton represented by general formula (I).

A compound represented by a structural formula (2) was synthesized by the following steps of: adding Lipal OH, cyanuric chloride and monosodium aniline-2,5-disulfonate in an ice water and proceeding a reaction while adding an aqueous solution of sodium hydroxide; subsequently adding an aqueous solution of sodium hydroxide to a reaction liquid to adjust a pH of the reaction liquid to 10; adding 28% aqueous ammonia and ethylenediamine to the reaction liquid to proceed a reaction; adding sodium chloride and concentrated hydrochloric acid dropwise to the obtained reaction liquid to precipitate crystals; filtrating the precipitated crystals, taking the crystals, and washing them with a 20% aqueous sodium chloride solution to obtain a wet cake; adding methanol and water to the obtained wet cake, further filtrating it, washing the residue with methanol, and then drying the residue. Thus, a compound represented by the structural formula (2) was obtained.

Structural formula (2)

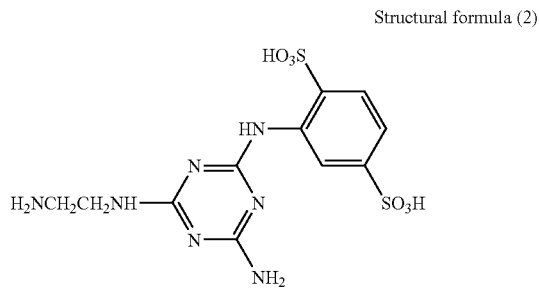

In addition, a coloring material H was synthesized on the basis of a synthesis method according to a pamphlet of International Publication No. 2004/087815. The substitution position of thus obtained copper phthalocyanine were only 4-position and 4'-position of a benzene ring, and there was no substituent group in 3-position and 3'-position. This is because the substituent is selectively introduced into only 4-position and 4'-position of a benzene ring in a phthalocyanine skeleton in a step of proceeding a reaction of forming the phthalocyanine ring, in the above described procedure.

<Evaluation of Color Developability>

(1) Preparation of Ink

The respective components shown in Table 4 below were mixed and sufficiently stirred. After that, the resultant product was filtered through a membrane filter having a pore size of 0.2 μm under pressure to prepare each of inks for Example 1 to 7 and Comparative Examples 1 to 4.

(2) Measurement of Maximum Absorption Wavelength (λmax)

After each of the inks of Examples 1 to 7 and Comparative Examples 1 to 4 (each having a coloring material concentration of 3.0 mass %) had been diluted 2,000 times with pure water, the maximum absorption wavelength (λmax) was measured. Table 5 shows the results.

The maximum absorption wavelength (λmax) was measured under the following conditions.

Spectrophotometer: Self-recording recording spectrophotometer (product with trade name of U-3300 made by Hitachi, Ltd.)

Measurement cell: 1 cm quartz cell

Sampling interval: 0.1 nm

Scanning rate: 30 nm/min

Number of measurements: Measurement was performed five times to take the average value of the five measurements.

(3) Production of Recorded Matter

Each of the inks of Examples 1 to 7 and Comparative Example 1 thus prepared was mounted on an ink jet recording apparatus (trade name: Pixus iP8600; manufactured by CANON Inc.) to record a 20-level gradation pattern on an ink jet glossy medium (trade name: PR101; manufactured by CANON Inc.) by changing a recording duty to 5, 10, 15, 20, 25, 30, 35, 40, 45, 50, 55, 60, 65, 70, 75, 80, 85, 90, 95 and 100%.

The PR101 used here as an ink jet glossy medium was alumina-coated paper having an ink absorbing layer mainly formed of fine particles of alumina hydrate. A structural formula of the above described alumina hydrate is $Al_2O_{3-n}(OH)_{2n}\cdot mH_2O$ (wherein n is any one integer of 1, 2 and 3; m is 0 to 10; and m and n are not simultaneously zero).

The above described ink absorbing layer further contains an additive for promoting the fixing and aggregation of a coloring material. The above described additives include, for instance, the followings: a salt of polyvalent metal such as magnesium, calcium, barium, zirconium and lanthanum and an inorganic acid or an organic acid, or a complex compound thereof; a polyamine-based cationic polymer such as a dicyandiamide-based condensate, a polyalkylenepolyamine-

TABLE 4

| | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| coloring material B | 3.0 | | | | | | | | | | |
| coloring material C | | 3.0 | | | | 3.0 | | | | | |
| coloring material D | | | 3.0 | | | | | | | | |
| coloring material E | | | | 3.0 | | | 3.0 | | | | |
| coloring material F | | | | | 3.0 | | | | | | |
| coloring material G | | | | | | | | | 3.0 | 3.0 | |
| coloring material H | | | | | | | | 3.0 | | | |
| coloring material A | | | | | | | | | | | 3.0 |
| Glycerin | 10.0 | 10.0 | 10.0 | 10.0 | 10.0 | 5.0 | 5.0 | 10.0 | 5.0 | 10.0 | 10.0 |
| Urea | 7.0 | 7.0 | 7.0 | 7.0 | 7.0 | 5.0 | 7.0 | 7.0 | 5.0 | 7.0 | 7.0 |
| 2-pyrrolidone | | | | | | 5.0 | | | | | |
| N-methyl-2-pyrrolidone | | | | | | 4.0 | | | 4.0 | | |
| Ethyleneglycol | 5.0 | 5.0 | 5.0 | 5.0 | 5.0 | | 5.0 | 5.0 | | 5.0 | 5.0 |
| Isopropyl alcohol | | | | | | 3.0 | | | 3.0 | | |
| Butyl carbitol | | | | | | 2.0 | | | 2.0 | | |
| Surfynol 104PG50 (*1) | | | | | | 0.1 | | | 0.1 | | |
| Acetylenol E100 (*2) | 1.0 | 1.0 | 1.0 | 1.0 | 1.0 | | 1.0 | 1.0 | | 1.0 | 1.0 |
| Ion-exchange water | 74.0 | 74.0 | 74.0 | 74.0 | 74.0 | 77.9 | 74.0 | 74.0 | 77.9 | 74.0 | 74.0 |

(*1) acetylene glycol (surfactant; manufactured by Nissin Chemical Industry)
(*2) acetylene glycol ethylene oxide adduct (surfactant; manufactured by Kawaken Fine Chemicals Co., Ltd.)

based condensate, a polyallylamine-based condensate, an aminoalkylmethacrylate-based condensate and an epihalohydrin-amine condensate; an inorganic polyvalent metal polymer such as poly aluminum chloride; and a quaternary ammonium salt of a compound having a nitrogen-containing heterocycle such as alkanolamine and piperidine ring.

The above described recording medium PR101 contains the above described additive; and has such characteristics as a pH of the surface is lower than 7, and a pore radius in an ink absorbing layer is 12 nm or less. The PR101 is thus composed that when a recorded matter is made thereon at a high recording duty, namely, made from such a coloring material as a high concentration of the coloring material stays on a recording medium, the recorded matter tends to show a more remarkable bronze phenomenon. The ink according to the present invention can particularly and effectively inhibit the occurrence of the bronze phenomenon, when used in combination with a glossy medium having such a composition, because a aggregation property of a coloring material in the ink is adequately controlled.

(4) Measurement of Color Developability (Reflection Density)

Reflection density was measured on a part recorded with 80% of a recording duty among 20-level gradation pattern of the recorded matter thus produced as the above described steps. Macbeth RD-918 (manufactured by Macbeth) was used to measure the reflection density. A value rounded off to the second decimal place was employed as the reflection density. The criteria for the color developability (reflection density) are as follows. Table 5 shows the results.
A: Reflection density of 2.1 or more
B: Reflection density of 2.0 or more and less than 2.1
C: Reflection density of 1.9 or more and less than 2.0
D: Reflection density of less than 1.9

TABLE 5

|  |  | Maximum absorption wavelength λmax[nm] | Color developability (reflection density) |
|---|---|---|---|
| Example | 1 | 612.5 | A |
|  | 2 | 612.0 | A |
|  | 3 | 610.4 | A |
|  | 4 | 609.0 | A |
|  | 5 | 608.5 | B |
|  | 6 | 611.9 | A |
|  | 7 | 609.0 | A |
| Comparative Example | 1 | 612.0 | D |

<Evaluation of Bronze Resistance>

(1) Measurement of $d_{75}$ Value

The scattering angle profile of a liquid, containing each of coloring materials A to G in an mount of 3 mass %, N,N-dimethylformamide in an mount of 50 mass % and pure water in an mount of 47 mass %, was measured by means of a small-angle X-ray scattering method.

The scattering angle profile was measured under the following conditions.
Apparatus: Nano Viewer (manufactured by Rigaku)
X-ray source: Cu—Kα
Output: 45 kV-60 mA
Effective focal spot: 0.3 mmφ+Confocal Max-Flux Mirror
$1^{st}$ slit: 0.5 mm, $2^{nd}$ slit: 0.4 mm, $3^{rd}$ slit: 0.8 mm
Irradiation time: 60 min
Beam stopper: 3.0 mmφ
Measurement method: Penetration method
Detector: Blue Imaging Plate A peak area obtained by removing a background and a 2θ value accounting for 75% or more of the entire peak area ($2θ_{75}$ value) were measured from the resultant scattering angle profile by means of an X-ray diffraction data processing soft JADE (Material Data, Inc.). The $d_{75}$ value was calculated from the $2θ_{75}$ value on the basis of the following Equation (2). A value rounded off to the third decimal place was employed as the $d_{75}$ value. Table 6 shows the results.

$$d_{75} = \frac{\lambda}{2\sin\theta_{75}} \quad \text{Equation (2)}$$

TABLE 6

| Coloring material | $d_{75}$ value [nm] |
|---|---|
| A | 5.54 |
| B | 5.60 |
| C | 5.65 |
| D | 5.70 |
| E | 5.90 |
| F | 6.10 |
| G | 6.17 |
| H | 6.21 |

(2) Measurement of Value B/A

After each of the inks Examples 1 to 7 and Comparative Examples 2 and, 3 had been diluted 2,000 times by mass with 90 mass % N,N-dimethylformamide aqueous solution, an absorbance A and an absorbance B were measured which are respectively maximum absorption wavelength existing in a range 580 nm or more and 640 nm or less and maximum absorption wavelength existing in a range 650 nm or more and 700 nm or less. From the obtained values of respective absorbances, a value B/A was determined. Table 7 shows the results.

The absorbances were under the following conditions.
Spectrophotometer: Self-recording spectrophotometer (trade name: U-3300; manufactured by Hitachi, Ltd.)
Measurement cell: 1 cm quartz cell
Measurement range: 200 nm or more and 800 nm or less
Sampling interval: 0.5 nm
Scanning speed: 300 nm/min
Number of measuring times: Measurement was performed once (2) Production of Recorded Matter Each of inks for Examples 1 to 7 and Comparative Examples 2 and 3 thus prepared was mounted on an ink jet recording apparatus (trade name: Pixus iP8600; manufactured by CANON Inc.) to record a 20-level gradation pattern on an ink jet glossy medium (trade name: PR101; manufactured by CANON Inc.) by changing a recording duty to 5, 10, 15, 20, 25, 30, 35, 40, 45, 50, 55, 60, 65, 70, 75, 80, 85, 90, 95 and 100%.

(3) Evaluation of Bronze Resistance

A recording duty at which the bronze phenomenon occurred in the 20-level gradation pattern in the recorded matter thus obtained was visually observed to define the recording duty as the recording duty at which the bronze phenomenon occurred. In general, the bronze phenomenon is apt to occur with increasing the recording duty. In other words, the bronze phenomenon is more likely to occur where the ink has a lower recording duty at which the bronze phenomenon occurs, while the bronze phenomenon is less likely to occur where the ink has a higher recording duty at which the bronze phenomenon occurs. The criteria for the bronze resistance are as follows. Table 7 shows the results.
A: The recording duty at which the bronze phenomenon occurs is 85% or more.
B: The recording duty at which the bronze phenomenon occurs is 65% or more and less than 85%.

C: The recording duty at which the bronze phenomenon occurs is 50% or more and less than 65%.
D: The recording duty at which the bronze phenomenon occurs is less than 50%.

TABLE 7

|  |  | Maximum absorption wavelength λmax [nm] | Value A | Value B | Value B/A | Bronze resistance |
|---|---|---|---|---|---|---|
| Example | 1 | 612.5 | 0.72 | 0.65 | 0.90 | A |
|  | 2 | 612.0 | 0.72 | 0.63 | 0.88 | A |
|  | 3 | 610.4 | 0.74 | 0.61 | 0.82 | A |
|  | 4 | 609.0 | 0.73 | 0.56 | 0.77 | B |
|  | 5 | 608.5 | 0.72 | 0.54 | 0.75 | B |
|  | 6 | 611.9 | 0.72 | 0.63 | 0.88 | A |
|  | 7 | 609.0 | 0.73 | 0.56 | 0.77 | A |
| Comparative Example | 2 | 605.5 | 0.73 | 0.51 | 0.70 | D |
|  | 3 | 605.5 | 0.73 | 0.51 | 0.70 | D |

In addition, among Examples 1 to 3, 6 and 7, which showed an evaluation result A for the bronze resistance, Example 7 showed the best bronze resistance.

<Evaluation of Environmental Gas Resistance)
(1) Production of Recorded Matter
Each of the inks of Examples 1 to 7 and Comparative Example 4 thus obtained was mounted on an ink jet recording apparatus (trade name: Pixus iP8600; manufactured by CANON Inc.) to record a pattern with a recording duty of 50% on a glossy medium (trade name: PR101; manufactured by CANON Inc.)

(2) Evaluation of Environmental Gas Resistance
The recorded matter thus obtained was placed in an ozone test apparatus (trade name: OMS-H; manufactured by Suga Test Instruments Co. Ltd.) to perform ozone exposure in an environment having a temperature of 40° C., a humidity of 55%, and an ozone gas concentration of 10 ppm for four hours. A remaining density ratio was calculated on the basis of the following equation (3) from the reflection density in the recorded matter before and after the exposure test. Macbeth RD-918 (manufactured by Macbeth) was used to measure the reflection density. A value rounded off to the nearest integer was employed as the remaining density ratio. The evaluation criteria for environmental gas resistance are as follows. Table 8 shows the results.

$$\text{Remaining density ratio} = \frac{d_{O3}}{d_{ini}} \times 100(\%) \quad \text{Equation (3)}$$

(In Equation (3), $d_{O3}$ is reflection density after ozone exposure and $d_{ini}$ is reflection density before ozone exposure.)

A: The remaining density ratio of 82% or more
B: The remaining density ratio of 79% or more and less than 82%
C: The remaining density ratio of 76% or more and less than 79%
D: The remaining density ratio of less than 76%

TABLE 8

|  |  | Maximum absorption wavelength λmax [nm] | Value A | Value B | Value B/A | Environmental gas resistance |
|---|---|---|---|---|---|---|
| Example | 1 | 612.5 | 0.72 | 0.65 | 0.90 | B |
|  | 2 | 612.0 | 0.72 | 0.63 | 0.88 | A |

TABLE 8-continued

|  |  | Maximum absorption wavelength λmax [nm] | Value A | Value B | Value B/A | Environmental gas resistance |
|---|---|---|---|---|---|---|
|  | 3 | 610.4 | 0.74 | 0.61 | 0.82 | A |
|  | 4 | 609.0 | 0.73 | 0.56 | 0.77 | A |
|  | 5 | 608.5 | 0.72 | 0.54 | 0.75 | A |
|  | 6 | 611.9 | 0.72 | 0.63 | 0.88 | B |
|  | 7 | 609.0 | 0.73 | 0.56 | 0.77 | A |
| Comparative Example | 4 | 631.5 | 0.71 | 0.74 | 1.04 | D |

In accordance with the above results, the following was confirmed. In the case where the coloring material of the present invention which is a compound represented by the general formula (I) or a salt thereof is used, high color developability can be obtained. Furthermore, the following was confirmed. In the case where the ink shows insufficient environmental gas resistance when a value B/A exceeds 0.90, which is a value obtained by measuring an absorbance of a liquid obtained by diluting an ink containing the above described coloring material into 2,000 times by mass with 90-mass % N,N-dimethylformamide aqueous solution. In addition, the following was confirmed. In the case where the ink having the above described value B/A of less than 0.75 shows insufficient bronze resistance.

In addition, the following was confirmed. In the case where the liquid containing 3.0 mass % of a coloring material, 50.0 mass % of N,N-dimethylformamide and 47.0 mass % of water shows a $d_{75}$ value of less than 5.60 nm, the ink shows insufficient environmental gas resistance. It was also confirmed that when the liquid shows a $d_{75}$ value of more than 6.10 nm, the ink shows insufficient environmental gas resistance.

Furthermore, the following was confirmed. In the case where the ink according to the present invention particularly shows its effect when used in combination with a recording medium having the same characteristics as in the above described Examples. Specifically, it is effective to use a recording medium which contains the previously described additive, and has such characteristics as a pH of the surface is lower than 7, and a pore radius in an ink absorbing layer is 12 nm or less. As a matter of course, it goes without saying that the ink according to the present invention using a compound represented by general formula (I) or a salt thereof as the coloring material can form an excellent image, even when used in combination with a recording medium other than the above described recording medium.

The present application claims the priorities from each of Japanese Patent Applications No. 2005-368243, filed Dec. 21, 2005 and No. 2006-342819, filed Dec. 20, 2006, the contents of which are incorporated herein by reference.

The invention claimed is:
1. An ink comprising at least a coloring material, wherein:
the coloring material comprises a compound represented by a following general formula (I) or a salt thereof; and
the maximum absorption wavelengths obtained by measuring an absorbance of a liquid prepared by diluting 2,000 times the ink by mass with 90 mass % of N,N-dimethylformamide aqueous solution are respectively in a range of 580 nm or more and 640 nm or less and in a range of 650 nm or more and 700 nm or less; and
a ratio B/A of 0.75 or more and 0.90 or less, wherein A is an absorbance at a maximum absorption wavelength in the range of 580 nm or more and 640 nm or less, and B is an absorbance at the maximum absorption wavelength in a range of 650 nm or more and 700 nm or less:

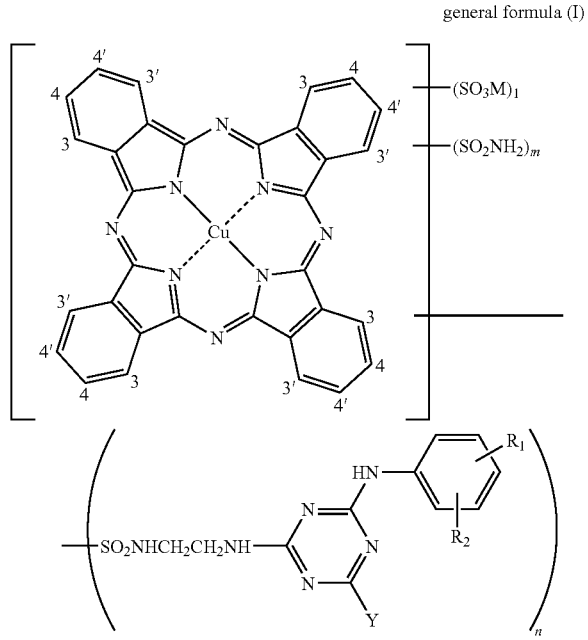

general formula (I)

wherein M represents an alkali metal or ammonium; $R_1$ and $R_2$ each independently represents a hydrogen atom, a sulfonic group, or a carboxyl group, provided that $R_1$ and $R_2$ are not simultaneously a hydrogen atom; Y represents a chlorine atom, a hydroxyl group, an amino group, or a monoalkylamino or dialkylamino group; l represents 0 to 2, m represents 1 to 3, and n represents 1 to 3, provided that 1+m+n=2 to 4, where the copper phthalocyanine possesses a substituent in at least one of 3-position and 3'-position in at least one benzene ring.

2. The ink according to claim 1, wherein the coloring material comprises a compound represented by a following general formula (II) or a salt thereof:

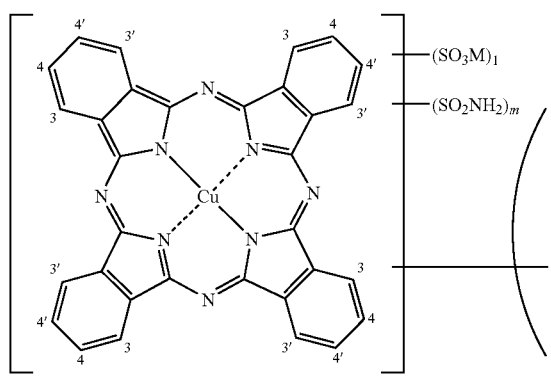

general formula (II)

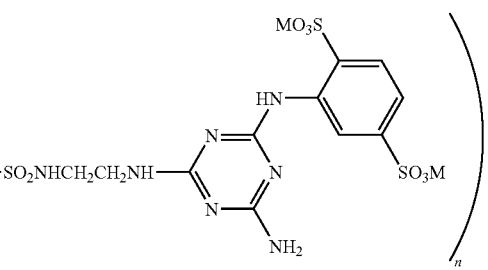

wherein M represents an alkali metal or ammonium; l represents 0 to 2, m represents 1 to 3, and n represents 1 to 3, provided that 1+m+n=2 to 4, where the copper phthalocyanine possesses a substituent in at least one of 3-position and 3'-position in at least one benzene ring.

3. The ink according to claim 1, wherein a content (mass %) of the coloring material in the ink is 3.0 mass % or more and 10.0 mass % or less with respect to the total mass of the ink.

4. The ink according to claim 1, wherein the ink further comprises water and a water-soluble organic solvent,
wherein the water-soluble organic solvent comprises at least 2-pyrrolidone, and
wherein the content (mass %) of the 2-pyrrolidone in the ink is 50.0 mass % or more with respect to the content (mass %) of the coloring material.

5. The ink according to claim 1, wherein both of the absorbance A and the absorbance B are 1 or less.

6. The ink according to claim 1, wherein in a dispersion distance distribution, measured by a small-angle X-ray scattering method, of molecular aggregates in a liquid containing 3.0 mass % of the coloring material, 50 mass % of N,N-dimethylformamide and 47.0 mass % of water, a dispersion distance $d_{75}$ value corresponding to 75% of the distribution is 5.60 nm or more to 6.10 nm or less.

7. The ink according to claim 1, wherein a maximum absorption wavelength corresponding to the absorbance A exists in a range of 608.0 nm or more and less than 612.0 nm, when a liquid prepared by diluting 2,000 times the ink by mass with water is measured for absorbance.

8. The ink according to claim 1, wherein a maximum absorption wavelength corresponding to the absorbance A exists in a range of 608.5 nm or more and less than 612.0 nm, when a liquid prepared by diluting 2,000 times the ink by mass with water is measured for absorbance.

9. An ink jet recording method, comprising ejecting an ink by an ink jet method to perform recording on a recording medium, wherein the ink comprises the ink according to claim 1.

10. An ink cartridge, comprising an ink storage portion for storing ink, wherein the ink comprises the ink according to claim 1.

11. A recording unit, comprising an ink storage portion for storing ink and a recording head for ejecting the ink, wherein the ink comprises the ink according to claim 1.

12. An ink jet recording apparatus, comprising an ink storage portion for storing ink and a recording head for ejecting the ink, wherein the ink comprises the ink according to claim 1.

* * * * *